US009674316B2

(12) United States Patent
Kwan et al.

(10) Patent No.: US 9,674,316 B2
(45) Date of Patent: Jun. 6, 2017

(54) METHODS AND SYSTEMS FOR IDENTIFYING DATA SESSIONS AT A VPN GATEWAY

(71) Applicant: Pismo Labs Technology Limited, Hong Kong (HK)

(72) Inventors: Ying Kwan, Hong Kong (HK); Ho Cheung Lam, Hong Kong (HK)

(73) Assignee: PISMO LABS TECHNOLOGY LIMITED, Hong Kong (HK)

( * ) Notice: Subject to any disclaimer, the term of this patent is extended or adjusted under 35 U.S.C. 154(b) by 172 days.

(21) Appl. No.: 14/396,749

(22) PCT Filed: Mar. 27, 2014

(86) PCT No.: PCT/IB2014/060205
§ 371 (c)(1),
(2) Date: Oct. 24, 2014

(87) PCT Pub. No.: WO2015/145209
PCT Pub. Date: Oct. 1, 2015

(65) Prior Publication Data
US 2015/0281408 A1    Oct. 1, 2015

(51) Int. Cl.
*H04L 29/06* (2006.01)
*H04L 12/46* (2006.01)
(Continued)

(52) U.S. Cl.
CPC .......... *H04L 69/22* (2013.01); *H04L 12/4633* (2013.01); *H04L 12/4641* (2013.01); *H04L 12/6418* (2013.01); *H04L 43/106* (2013.01); *H04L 63/0227* (2013.01); *H04L 63/0272* (2013.01); *H04L 61/2514* (2013.01)

(58) Field of Classification Search
None
See application file for complete search history.

(56) References Cited

U.S. PATENT DOCUMENTS

2007/0153798 A1*  7/2007  Krstulich ............ H04L 12/2898
                                                  370/392
2012/0243410 A1*  9/2012  Vedula ................ H04L 41/5025
                                                  370/235
2014/0071830 A1   3/2014  Weill et al.

FOREIGN PATENT DOCUMENTS

CN    103023670 A    4/2013
CN    103095701 A    5/2013

OTHER PUBLICATIONS

International Search Report in International Application No. PCT/IB2014/060205, mailed on Jan. 6, 2015.
(Continued)

*Primary Examiner* — Christopher Crutchfield
*Assistant Examiner* — Alan Lindenbaum

(57) ABSTRACT

Methods and systems for identifying Internet Protocol (IP) data sessions at a VPN gateway. The VPN gateway receives encapsulating packets, wherein the encapsulating packets encapsulate IP packets. A corresponding VPN connection through which the encapsulating packets are received is identified. The VPN gateway decapsulates the encapsulating packets to retrieve the IP packets and performs deep packet inspection (DPI) on the IP packets in order to identify one or more data sessions that the IP packets belong to. A DPI database is updated accordingly, based on, at least in part, the one or more data sessions.

22 Claims, 20 Drawing Sheets

(51) Int. Cl.
*H04L 12/26* (2006.01)
*H04L 12/64* (2006.01)
*H04L 29/12* (2006.01)

(56) References Cited

OTHER PUBLICATIONS

Written opinion of the International Searching Authority in International Application No. PCT/IB2014/060205, mailed on Jan. 6, 2015.

* cited by examiner

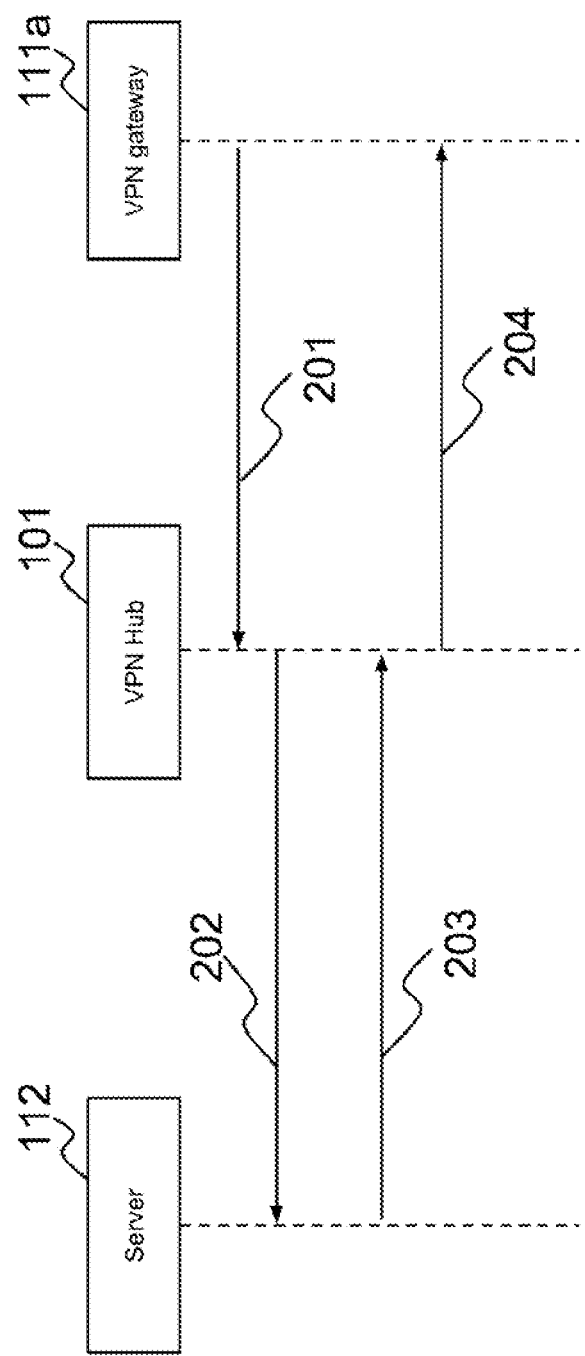

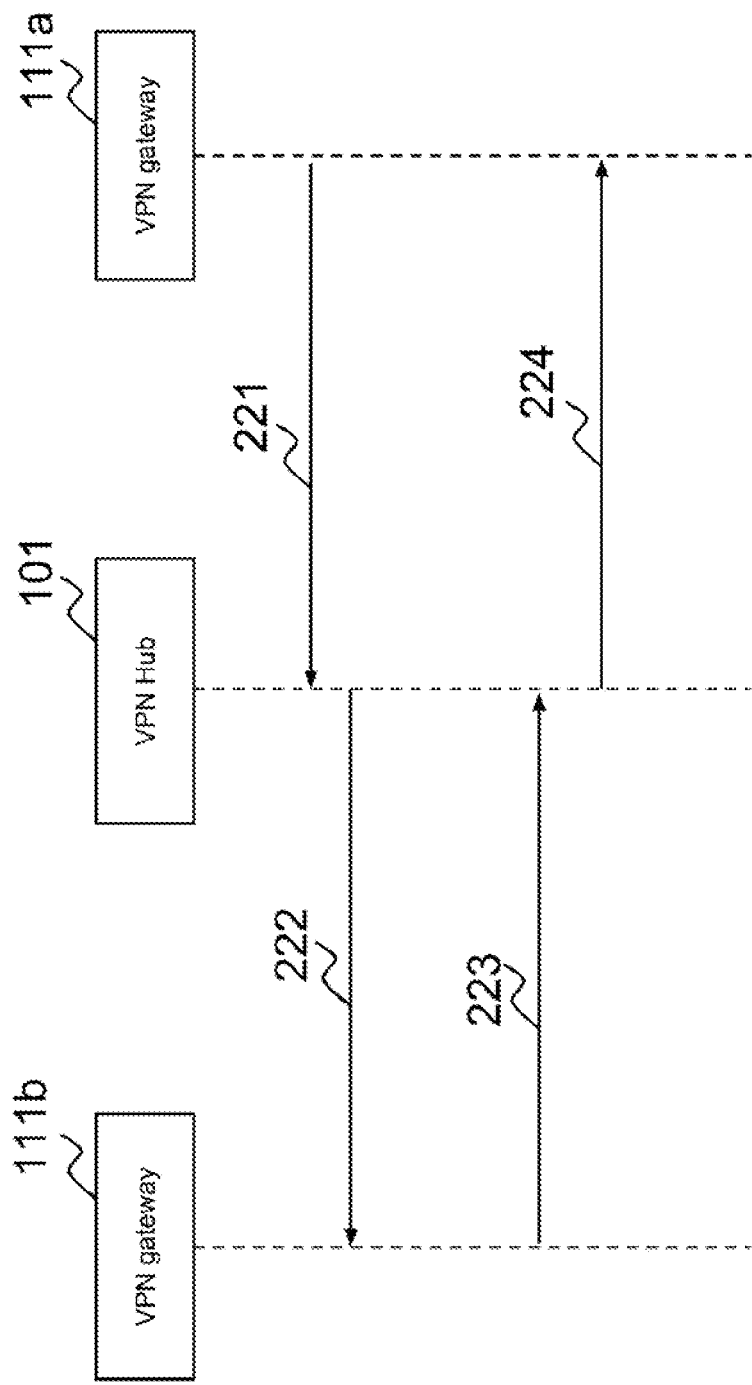

METHODS AND SYSTEMS FOR IDENTIFYING DATA SESSIONS AT A VPN GATEWAY

TECHNICAL FIELD

The present invention relates in general to the field of computer networks. More particularly, the present invention relates to a method for identifying Internet Protocol (IP) data sessions at a VPN gateway by performing deep packet inspection (DPI) and updating a DPI database accordingly.

BACKGROUND ART

Deep Packet Inspection (DPI) performed at a firewall allows examining the data part (and possibly also the header) of an IP packet that passes through the firewall, searching for protocol non-compliance, viruses, spam, intrusions, or defined criteria to decide whether the IP packet may pass or if it needs to be routed to a different destination, or, for the purpose of collecting statistical information.

There are multiple ways to acquire packets for deep packet inspection. Using port mirroring (sometimes called Span Port) is a very common way, as well as optical splitter. Deep Packet Inspection (and filtering) enables advanced network management, user service, and security functions as well as internet data mining, eavesdropping, and internet censorship.

However, as there is a lot of information to be inspected, including users, data sessions, protocols, source IP address, and destination IP address, an administrator may easily overlook some of the information and correlation among the information. Therefore an easy-to-use user interface is important. Furthermore, a firewall cannot inspect IP packets that are transmitted and received through a VPN connection if the firewall does not have the security information to decrypt the VPN connection. Therefore when an IP packet is encapsulated in one or more encapsulating packets, a firewall has to decapsulate the IP packet from the corresponding encapsulating packet(s) before inspecting the IP packet.

DISCLOSURE OF INVENTION

Summary of Invention

The embodiments of the present invention describe, in general, a VPN gateway identifying one or more data sessions by performing deep packet inspection (DPI).

According to various embodiments of the present invention, the VPN gateway receives encapsulating packets and identifies a corresponding VPN connection through which the encapsulating packets are received. The encapsulating packets encapsulate IP packets. The VPN gateway performs deep packet inspection on the IP packets in order to identify one or more data sessions that the IP packets belong to. A DPI database is updated based, at least in part, on the one or more data sessions.

According to one of the embodiments, updating the DPI database includes adding a new record in the DPI database if one or more data sessions are identified for the first time.

According to one of the embodiments, information corresponding to the one or more data sessions is displayed at a user interface. The information is retrieved from the DPI database. The user interface may be shown on a display which is not coupled to the VPN gateway. In one example, the information is retrieved from the DPI database after a query is performed. The information may be categorized according to a category and statistical data. Alternatively, the information may be categorized according to a plurality of categories, and the information further includes correlation among items in the plurality of categories. The plurality of categories may be selected from a group consisting of source IP address, destination IP address, source port, destination port, IP protocol, application, accumulated size of IP packet payloads received, accumulated size of IP packet payloads transmitted, domain name, begin timestamp and end timestamp.

According to one of the embodiments of the present invention, the VPN gateway is a VPN hub which establishes one or more VPN connections with one or more other VPN gateways respectively. The one or more VPN connections may be combined to form an aggregated VPN connection.

DETAILED DESCRIPTION

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Embodiments, or portions thereof, may be embodied in program instructions operable upon a processing unit for performing functions and operations as described herein. The program instructions making up the various embodiments may be stored in a storage medium.

The program instructions making up the various embodiments may be stored in a storage medium. Moreover, as disclosed herein, the term "storage medium" may represent one or more devices for storing data, including read only memory (ROM), programmable read-only memory (PROM), erasable programmable read-only memory (EPROM), random access memory (RAM), magnetic RAM, core memory, floppy disk, flexible disk, hard disk, magnetic tape, CD-ROM, flash memory devices, a memory card and/or other machine readable mediums for storing information. The term "machine-readable medium" includes, but is not limited to portable or fixed storage devices, optical storage mediums, magnetic mediums, memory chips or cartridges, wireless channels and various other mediums capable of storing, containing or carrying instruction(s) and/or data. A machine-readable medium can be realized by virtualization, and can be a virtual machine readable medium including a virtual machine readable medium in a cloud-based instance.

The term computer-readable medium, main memory, or secondary storage, as used herein refers to any medium that participates in providing instructions to a processing unit for execution. The computer-readable medium is just one example of a machine-readable medium, which may carry instructions for implementing any of the methods and/or techniques described herein. Such a medium may take many forms, including but not limited to, non-volatile media, volatile media, and transmission media. Non-volatile media includes, for example, optical or magnetic disks. Volatile media includes dynamic memory. Transmission media includes coaxial cables, copper wire and fiber optics. Transmission media can also take the form of acoustic or light waves, such as those generated during radio-wave and infra-red data communications.

A volatile storage may be used for storing temporary variables or other intermediate information during execution of instructions by a processing unit. A non-volatile storage or static storage may be used for storing static information and instructions for processor, as well as various system configuration parameters.

The storage medium may include a number of software modules that may be implemented as software code to be executed by the processing unit using any suitable computer instruction type. The software code may be stored as a series of instructions or commands, or as a program in the storage medium.

Various forms of computer readable media may be involved in carrying one or more sequences of one or more instructions to the processor for execution. For example, the instructions may initially be carried on a magnetic disk from a remote computer. Alternatively, a remote computer can load the instructions into its dynamic memory and send the instructions to the system that runs the one or more sequences of one or more instructions.

A processing unit may be a microprocessor, a microcontroller, a digital signal processor (DSP), any combination of those devices, or any other circuitry configured to process information.

A processing unit executes program instructions or code segments for implementing embodiments of the present invention. Furthermore, embodiments may be implemented by hardware, software, firmware, middleware, microcode, hardware description languages, or any combination thereof. When implemented in software, firmware, middleware or microcode, the program instructions to perform the necessary tasks may be stored in a computer readable storage medium. A processing unit(s) can be realized by virtualization, and can be a virtual processing unit(s) including a virtual processing unit in a cloud-based instance.

Embodiments of the present invention are related to the use of a computer system for implementing the techniques described herein. In an embodiment, the inventive processing units may reside on a machine such as a computer platform. According to one embodiment of the invention, the techniques described herein are performed by computer system in response to the processing unit executing one or more sequences of one or more instructions contained in the volatile memory. Such instructions may be read into the volatile memory from another computer-readable medium. Execution of the sequences of instructions contained in the volatile memory causes the processing unit to perform the process steps described herein. In alternative embodiments, hardwired circuitry may be used in place of or in combination with software instructions to implement the invention. Thus, embodiments of the invention are not limited to any specific combination of hardware circuitry and software.

A code segment, such as program instructions, may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Alternatively, hardwired circuitry may be used in place of, or in combination with, software instructions to implement processes consistent with the principles of the invention. Thus, implementations consistent with principles of the invention are not limited to any specific combination of hardware circuitry and software.

A network interface that may be provided by a node is an Ethernet interface, a frame relay interface, a fibre optic interface, a cable interface, a DSL interface, a token ring interface, a serial bus interface, an universal serial bus (USB) interface, Firewire interface. Peripheral Component Interconnect (PCI) interface, etc.

A network interface may be implemented by a standalone electronic component or may be integrated with other electronic components. A network interface may have no network connection or at least one network connection depending on the configuration. A network interface may be an Ethernet interface, a frame relay interface, a fibre optic interface, a cable interface, a Digital Subscriber Line (DSL) interface, a token ring interface, a serial bus interface, a universal serial bus (USB) interface. Firewire interface, Peripheral Component Interconnect (PCI) interface, etc.

A network interface may connect to a wired or wireless access network. An access network may carry one or more network protocol data. A wired access network may be implemented using Ethernet, fiber optic, cable, DSL, frame relay, token ring, serial bus, USB, Firewire, PCI, or any material that can pass information. An wireless access network may be implemented using infra-red, High-Speed Packet Access (HSPA), HSPA+, Long Term Evolution (LTE), WiMax, GPRS, EDGE, GSM, CDMA, WiFi, CDMA2000, WCDMA, TD-SCDMA, BLUETOOTH, WiBRO, Evolution-Data Optimized (EV-DO); Digital Enhanced Cordless Telecommunications (DECT); Digital AMPS (IS-136/TDMA); Integrated Digital Enhanced (iDEN) or any other wireless technologies.

Embodiments, or portions thereof, may be embodied in a computer data signal, which may be in any suitable form for communication over a transmission medium such that it is readable for execution by a functional device (e.g., processing unit) for performing the operations described herein. The computer data signal may include any binary digital electronic signal that can propagate over a transmission medium such as electronic network channels, optical fibers, air, electromagnetic media, radio frequency (RF) links, and the like, and thus the data signal may be in the form of an electrical signal, optical signal, radio frequency or other wireless communication signal, etc. The code segments may, in certain embodiments, be downloaded via computer networks such as the Internet, an intranet, local area network (LAN), metropolitan area network (MAN), wide area network (WAN), the PSTN, a satellite communication system, a cable transmission system, and/or the like.

FIG. 1 illustrates an exemplary network environment according to various embodiments of the present invention. VPN gateways 111a, 111b, and 111c, hosts 113a and 113b, server 112, and VPN hub 101 are connected to interconnected networks 102. Hosts 114a and 114b are connected to VPN gateways 111a and 111b respectively. VPN gateways and hosts may have one or more WAN interfaces connecting to interconnected networks 102. For example, VPN gateway 111a, 111 b and 111c connects to interconnected networks 102 through two, one and three WAN interfaces respectively. VPN hub 101 connects to interconnected networks 102 through one network interface. VPN hub 101 may connect to interconnected networks 102 through one or more network interfaces.

Interconnected networks 102 can be a public network such as the Internet. Alternatively, interconnected networks 102 can also be a private network. A VPN gateway, such as VPN gateways 111a, 111b and 111c, is a device or a node on a network which performs protocol conversion between different types of networks or applications and capable of establishing VPN connections. The term VPN gateway is not meant to be limited to a single type of device, as any device, hardware or software, that may act as a bridge between the user and the networks may be considered a gateway for purposes of this application. The gateway may couple with a plurality of networks. A router, a switch, a bridge, a wireless access point, a virtual machine in a computing device or any apparatus capable of acting as an access point to another network and establishing VPN connections may all be considered as a gateway for purposes of this invention.

A VPN gateway may have one or more WAN interfaces for connecting to interconnected networks. A VPN gateway may also have one or more LAN interfaces for connecting to one or more hosts. VPN gateway 111a is connected to host 114a through one of its LAN interfaces and is connected to host 114c through another one of its LAN interfaces. VPN gateway 111b is connected to host 114b through one of its LAN interfaces.

A host can be a computing device, a laptop computer, a mobile phone, a smartphone, a desktop computer, a personal digital assistant, or any other electronic device that is capable of connecting to a VPN gateway and to interconnected networks.

Server 112 may be a web server, a database server, a sensor server, a transaction server, a host, or a node. The access to server 112 may be restricted or not.

A VPN hub, such as VPN hub 101, may perform as a hub for other VPN gateways 111a, 111b and 111c as well as hosts 113a and 113b. VPN hub 101 may also be a VPN gateway and may also be used by an administrator of VPN gateways 111a-111c, and hosts 113a and 113b. VPN hub 101 can be used to administer VPN gateways 111a-111c, and hosts 113a and 113b. VPN hub 101 can be a desktop computer, a laptop computer, or a mobile device. VPN hub 101 may have one or more network interfaces. At least one of the network interfaces must be connected to interconnected networks 102 for establishing VPN connections with VPN gateways 111a-111c and hosts 113a-113b. In the example that when VPN hub 101 performs as a VPN gateway, one or more hosts and/or nodes may connect to VPN hub 101 as well as transmit and receive IP packets through VPN hub 101.

VPN gateways 111a-111c and hosts 113a and 113b may form VPN connection(s) with VPN hub 101. For example, VPN gateway 111a may establish a VPN connection or an aggregated VPN connection with VPN hub 101 through one or more of its interfaces and through one or more WAN interfaces of VPN hub 101. In one example, VPN gateways 111a-111c, host 113a and host 113b are spoke and VPN hub 101 is a hub that all together form a VPN hub-and-spoke network environment. Therefore when hosts connecting to different VPN gateways communication with each other, the IP packets holding the communication data will pass through VPN hub 101. In another example, VPN gateways 111a-111c and hosts 113a and 113b transmit and receive any encapsulating packets to and from any node through the VPN connections established with VPN hub 101. As a result, VPN gateway 111c may transmit and receive encapsulating packets to and from server 112 through VPN hub 101.

The one or more VPN connections can be combined, bonded or aggregated to form an aggregated VPN connection. Using an aggregated VPN connection may result in higher bandwidth which is a combined bandwidth of the individual VPN connections. In one variant, a plurality of tunnels are used to form one aggregated VPN connection, wherein the tunnels are established between a VPN gateway 111 and VPN hub 101. The aggregated VPN connection may be perceived as one VPN connection by sessions or applications that are using it.

FIG. 8 is an illustrative block diagram of a VPN hub, such as VPN hub 101 according to one of the embodiments of the present invention. VPN hub 101 comprises processing unit 801, main memory 802, system bus 803, secondary storage 804, and network interface 805. Processing unit 801 and main memory 802 are connected to each other directly. System bus 803 connects processing unit 801 directly or indirectly to secondary storage 804, and network interface 805. Using system bus 803 allows VPN hub 101 to have increased modularity. System bus 803 couples processing unit 801 to secondary storage 804, and network interface 805. System bus 803 can be any of several types of bus structures including a memory bus, a peripheral bus, and a local bus using any of a variety of bus architectures. Secondary storage 804 stores program instructions for execution by processing unit 801. The processes or steps performed by VPN hub 101 are in response to processing unit 801 executing one or more sequences of one or more program instructions stored in secondary storage 804. The scope of the invention is not limited to VPN hub 101 having one network interface only, such that VPN hub 101 may have one or more network interfaces.

FIG. 9 is an illustrative block diagram of a VPN gateway, such as VPN gateways 111a, 111b or 111c according to one of the embodiments of the present invention. VPN gateway 900 may represent VPN gateway 111a, 111b or 111 c, as the VPN gateways have similar architecture. VPN gateway 900 comprises processing unit 901, main memory 902, system bus 903, secondary storage 904, WAN interfaces 905, and LAN interface 906. Processing unit 901 and main memory 902 are connected to each other directly. System bus 903 connects processing unit 901 directly or indirectly to secondary storage 904, WAN interfaces 905, and LAN interface 906. Using system bus 903 allows VPN gateway 900 to have increased modularity. System bus 903 couples processing unit 901 to secondary storage 904, WAN interfaces 905, and LAN interface 906. System bus 903 can be any of several types of bus structures including a memory bus, a peripheral bus, and a local bus using any of a variety of bus architectures. Secondary storage 904 stores program instructions for execution by processing unit 901. The processes or steps performed by VPN gateway 111*a*, 111*b* or 111*c* are in response to processing unit 901 of VPN gateway 111*a*, 111*b* or 111*c*, respectively, executing one or more sequences of one or more program instructions stored in secondary storage 904 of VPN gateway 111*a*, 111*b* or 111*c* respectively. The scope of the invention is not limited to VPN gateway 900 having one WAN interface or one LAN interface only, such that VPN gateway 900 may have one or more WAN interfaces and one or more LAN interfaces.

FIG. 2A is a sequence diagram illustrating communication steps according to one of the embodiments of the present invention.

In communication step 201, VPN gateway 111*a* transmits a first encapsulating IP packet to VPN hub 101 through a first VPN connection. Processing unit 801 of VPN hub 101 can then decapsulate the first encapsulating IP packet to retrieve a first IP packet and perform DPI on the first IP packet to gather information about the first IP packet. The first IP packet may be originated from a host connected to VPN gateway 111*a*. For illustration purpose, the first IP packet is destined to server 112. Therefore in communication step 202, VPN hub 101 transmits the first IP packet to server 112. Server 112 then transmits a second IP packet to VPN hub 101 in communication step 203 in response to the first IP packet. The second IP packet is destined to VPN gateway 111*a*. When VPN hub 101 receives the second IP packet, it performs DPI on the second IP packet and then encapsulates the second IP packet in a second encapsulating packet. VPN hub 101 then transmits the second encapsulating packet to VPN gateway 111*a* in communication step 204. Processing unit 901 of VPN gateway 111*a* can decapsulate the second encapsulating packet to retrieve the second IP packet.

After performing DPI on packets, processing unit 801 of VPN hub 101 records information corresponding to the packets in a DPI database. In one variant, the first VPN connection may be an aggregated VPN connection.

FIG. 2B is a sequence diagram illustrating communication steps according to one of the embodiments of the present invention.

VPN gateways 111*a* and 111*b* establishes a first and second VPN connection with VPN hub 101 respectively. In communication step 211, host 114*a* transmits a first IP packet to VPN gateway 111*a*, where the first IP packet is destined to host 114*b*. Processing unit 901 of VPN gateway 111*a* then encapsulates the first IP packet in a first encapsulating packet and transmits the first encapsulating packet to VPN hub 101 through the first VPN connection in communication step 212. Processing unit 801 of VPN hub 101 decapsulates the first encapsulating packet to retrieve the first IP packet and route the first IP packet. Processing unit 801 of VPN hub 101 may also perform DPI on the first IP packet. Processing unit 801 of VPN hub 101 then encapsulates the first IP packet in a second encapsulating packet and transmits the second encapsulating packet to VPN gateway 111*b* through the second VPN connection in communication step 213. The DPI may be performed at about the same time as transmitting the second encapsulating packet in order to reduce memory usage for storing the first IP packet for performing DPI.

Processing unit 901 of VPN gateway 111*b* decapsulates the second encapsulating packet to retrieve the first IP packet and transmits the first IP packet to host 114*b* in communication step 214.

Host 114*b* then transmits a second IP packet to VPN gateway 111*b* in communication step 215 in response to the first IP packet. The second IP packet is destined to host 114*a*. When VPN gateway 111*b* receives the second IP packet through one of its LAN interfaces, processing unit 901 of VPN gateway 111*b* encapsulates the second IP packet in a third encapsulating packet and transmits the third encapsulating packet to VPN hub 101 through the second VPN connection in communication step 216. Processing unit 801 of VPN hub 101 decapsulates the third encapsulating packet to retrieve the second IP packet and route the second IP packet. Processing unit 801 of VPN hub may also perform DPI on the second IP packet. Processing unit 801 of VPN hub 101 then encapsulates the second IP packet in a fourth encapsulating packet and transmits the fourth encapsulating packet to VPN gateway 111*a* through the first VPN connection in communication step 217. Processing unit 901 of VPN gateway 111*a* decapsulates the fourth encapsulating packet to retrieve the second IP packet and transmits the second IP packet to host 114*a* in communication step 218.

In one variant, VPN hub 101 stores the data in the packets passing through it for performing DPI on the packets at a later time. For example, after communication step 212, processing unit 801 of VPN hub 101 decapsulates the first encapsulating packet to retrieve the first IP packet, stores the first IP packet, encapsulates the first IP packet in the second encapsulating packet, and transmits the second encapsulating packet to VPN gateway 111*b* in communication step 213. Instead of performing DPI before communication step 213, processing unit 801 of VPN hub 101 stores the first IP packet in a storage medium, such as secondary storage 804 or main memory 802, such that it can perform DPI at a later time. This ensures that computing resources of VPN hub are dedicated to transmitting and receiving packets during an ongoing data session. VPN hub 101 may use computing resources for performing DPI at a later time.

FIG. 2C is a sequence diagram illustrating communication steps according to one of the embodiments of the present invention.

In communication step 221, VPN gateway 111*a* transmits a first encapsulating IP packet to VPN hub 101 through a first VPN connection. Processing unit 801 of VPN hub 101 can then decapsulate the first encapsulating IP packet to retrieve a first IP packet and perform DPI on the first IP packet to gather information about the first IP packet. The first IP packet may be originated from VPN gateway 111*a*. For illustration purpose, the first IP packet is destined to VPN gateway 111*b*. Processing unit 801 of VPN hub 101 encapsulates the first IP packet in a second encapsulating IP packet. In communication step 222, VPN hub 101 transmits the second encapsulating IP packet to VPN gateway 111*b*. Processing unit 901 of VPN gateway 111*b* then decapsulates the second encapsulating packet to retrieve the first IP packet. Processing unit 901 of VPN gateway 111*b* then encapsulates a second IP packet in a third encapsulating packet. The second IP packet is destined to VPN gateway 111*a*. VPN gateway 111*b* then transmits the third encapsulating packet to VPN hub 101 in communication step 223 in response to the second encapsulating packet. When VPN hub 101 receives the third encapsulating packet, processing unit 801 of VPN hub 101 decapsulates the third encapsulating packet to retrieve the second IP packet. Processing unit 801 of VPN hub 101 then performs DPI on the second IP packet and then encapsulates the second IP packet in a fourth encapsulating packet. VPN hub 101 then transmits the fourth encapsulating packet to VPN gateway 111*a* in communication step 224. Processing unit 901 of VPN gateway 111*a* can decapsulate the fourth encapsulating packet to retrieve the second IP packet.

After performing DPI on packets, processing unit 801 of VPN hub 101 records information corresponding to the packets in a DPI database. In one variant, the first VPN connection may be an aggregated VPN connection.

According to one of the embodiments of the present invention, VPN hub 101 provides the IP address for VPN gateways 111a-111c, hosts 113a-113b, and hosts 114a-114b. VPN hub 101 also assigns the IP address to each of VPN gateways 111a-111c, hosts 113a-113b, and hosts 114a-114b. Alternatively, VPN hub 101 assigns the IP address to each of VPN gateways 111a-111c and hosts 113a and 113b while VPN gateway 111a assigns an IP address provided by VPN hub 101 to hosts 114a and VPN gateway 111b assigns an IP address provided by VPN hub 101 to hosts 114b. For example, host 114a is provided with an IP address 10.8.1.3. The IP address 10.8.1.3 may be assigned by VPN gateway 111a or by VPN hub 101.

In one variant. VPN gateways 111a and 111b may perform network address translation (NAT) for hosts connecting to them respectively. For example, VPN gateway 111a may provide and assign an IP address to host 114a. The IP address provided and assigned may be in different subnet from the subnet of the IP address assigned to VPN gateway 111a by VPN hub 101. Therefore the source IP address of the IP packets encapsulated in encapsulating packets is the IP address of VPN gateway 111a. When VPN hub 101 performs DPI on the IP packets, it may not be able to distinguish IP packets from/to host 114a from other IP packets from/to other hosts connecting to VPN gateway 111a by using source/destination IP address.

FIG. 3A illustrates a process according to one of embodiments of the present invention. The process may be carried out by processing unit 801 by executing program instructions stored in secondary storage 804 or main memory 802. When VPN hub 101 receives encapsulating packets at step 301 through interconnected networks 102, it first determines the VPN connection that the encapsulating packets belonging to at step 302. A VPN hub 101 may terminate hundreds, thousands, even millions of VPN connections. VPN hub 101 may identify the VPN connection according to a unique identifier embedded in the encapsulating packets. The unique identifier can be based on one or more of source IP address, destination IP address, source port, destination port, information stored in the header of encapsulating packets, and/or information stored in the payload of encapsulating packets that can be decrypted or retrieved by VPN hub 101. For example, VPN hub 101 identifies a VPN connection an encapsulating packet belongs to based on the source IP address and destination port number in the header of the encapsulating packet and a global sequence number in the payload of the encapsulating packet. The global sequence number may not be encrypted and may be used for recording IP packets in aggregated VPN connection. In one variant, the global sequence number is encrypted but can be decrypted using a private key of VPN hub 101.

At step 303, VPN hub 101 retrieves the IP packet encapsulated in encapsulating packets. VPN hub 101 decapsulates encapsulating packets using corresponding information of the VPN connection. For example, after VPN hub 101 identifies a VPN connection at step 302, it retrieves the corresponding information from a database to terminate and decrypt the VPN connection. The corresponding information may include secret code, digital certificate, password, and protocol.

At step 304, VPN hub 101 identifies the IP packet according to the header information and/or payload of the IP packet. Those who are skilled in the art would appreciate that DPI can be performed using information of different parts of an IP packet and/or a plurality of IP packets, including traffic pattern, and patterns of the contents of the payload. Some of the DPI tools that can be used to identify the IP packet in step 304 include nDPI and OpenDPI. The identification can be conducted at different Open Systems Interconnection (OSI) levels. For example, an IP packet can be identified as being generated by Skype application. In another example, an IP packet can be identified as related to a video download from YouTube website.

Those who are skilled in the arts would appreciate that DPI may able to identify communication protocol of the IP packet, including Secure Sockets Layer (SSL), Hypertext Transfer Protocol (HTTP). Domain Name System (DNS), Session Initiation Protocol (SIP), Control And Provisioning of Wireless Access Points (CAPWAP), Internet Protocol Security (IPSec), Internet Control Message Protocol (ICMP), etc. The protocol of an encapsulating packet or IP packet can be recorded in the protocol section of the DPI database.

Performing DPI on encapsulating packets may also indicate whether the encapsulating packets are management packets for managing a connection, or data packets holding data.

VPN hub 101 can record the time at which encapsulating packets are sent or received at a VPN gateway or VPN hub 101. The time may be recorded in a DPI database. The DPI database can be stored locally in a storage medium of VPN hub 101, such as secondary storage 804 or main memory 802, or can be stored remotely in a remote server. The DPI database can be stored locally in a storage medium of a VPN gateway, such as secondary storage 904 or main memory 902, if the DPI is going to be performed by the VPN gateway.

VPN hub 101 may also record the number of ongoing data sessions corresponding to a node in the DPI database. For example, server 112, host 113a, host 114a, and VPN gateway 111c has seven, twenty, ten and thirty ongoing data sessions respectively. DPI may be performed by VPN hub 101 in order to determine what type of data is being transmitted and received at VPN gateways 111a-111c and hosts 113a and 113b. Alternatively. DPI may also be performed at one or more of VPN gateways 111a-111c in order to determine what type of data is being transmitted and received through the one or more of VPN gateways 111a-111c.

At step 305, VPN hub 101 determines whether the IP packet belongs to any data session already recorded in a DPI database. The DPI database is used to store information after successfully identifying the IP packet. As it is common that IP packets are sent or received in stream, prior IP packets belonging to the same stream may have already be identified and recorded in the DIP database. In order to reduce the size the DIP database, no new record needs to be added for the IP packet if the IP packet is not the first in the stream. The record corresponding to the stream may be updated according to the information related to the IP packet at step 307. For example, VPN hub 101 may only update the size field and time field of the corresponding record according to the size of IP packet and time of arrival of the IP packet. If the IP packet is the first in the stream, then VPN hub 101 creates a record in the DPI database to store information related to the stream at step 306, such as source IP address, destination IP address, starting time, application, protocol, user identity, source port, destination port, security information, VPN connection information, computing resource usage, bandwidth usage, and other information that can assist ad administrator of VPN hub 101 to identify and/or manage IP packets passing through VPN connections terminated at VPN hub 101.

The DPI database may be a relational or non-relational database. In one example, the DPI database is a SQLite database, such that SQL command can be used to retrieve one or more records related to a stream. In particular the SQL command may be based on the information retrieved after performing DPI on the IP packet to determine whether the stream has been recorded in step 305. In another variant, the SQL command is used to retrieve records related to the stream. The fields of the DPI database may include source IP address, destination IP address, source port, destination port, IP protocol, application, accumulated size of IP packet payloads received, accumulated size of IP packet payloads transmitted, domain name, begin timestamp and end timestamp.

As the IP packet is encapsulated in one or more encapsulating packets, the source IP address and destination IP address of the IP packet recorded in a record of the DPI database may depend on whether VPN gateway 111*b* performs network address translation. For example, when VPN hub 101 performs DPI on an IP packet originating from host 114*b* and the IP address of host 114*b* is provided by VPN hub 101, the source IP address of the IP packet is the IP address of host 114*b* while the source IP address of the encapsulating packet is the IP address of the WAN interface which is used to establish the VPN connection with VPN hub 101, of the VPN gateway 111*b*. In another example, when VPN hub 101 performs DPI on an IP packet originating from host 114*b* and the source IP address of the IP packet has been translated by VPN gateway 111*b* using network address translation (NAT) technique, the source IP address of the encapsulating packet is the IP address of the interface of VPN gateway 111*b*, while the source IP address of the IP packet is the IP address of VPN gateway 111*b*. Those who are skilled in the art would appreciate that whether VPN gateway would perform NAT may depend on different network architecture.

In another example, the source IP address of encapsulating packets may be the IP address one of VPN gateways 111*a*-111*c*, hosts 114*a*-114*b*, or hosts 113*a*-113*b*. For example, VPN gateway 111*a* establishes a first VPN connection with VPN hub 101, and host 114*a* transmits an IP packet destined to server 112 through the first VPN connection. The source IP address of the IP packet is the IP address of host 114*a*. When VPN gateway 111*a* receives the IP packet from host 114*a*, it may encapsulate the IP packet in an encapsulating packet whose source IP address is the IP address of VPN gateway 111*a*. When VPN hub 101 performs DPI on the encapsulating packet, it determines that the original source IP address of the IP packet is the IP address of host 114*a*, and therefore updates the DPI database with the source IP address of host 114*a* if necessary.

The destination IP address of encapsulating packets transmitted through VPN hub 101 can be determined by performing DPI on the encapsulating packets. The destination IP address can be the IP address of a webpage, a server, or a host. For example, if host 113*a* sends an encapsulating packet destined to server 112 through a VPN connection established with VPN hub 101, the DPI database is updated with destination IP address of server 112 if necessary.

In another example, host 113*a* establishes a second VPN connection with VPN hub 101, and transmits an IP packet destined to server 112 through the second VPN connection. The source IP address of the IP packet is the IP address of host 113*a*. The IP packet is first encapsulated in an encapsulating packet by host 113*a*, and then transmitted to VPN hub 101. When VPN hub 101 receives the encapsulating packet, it performs DPI on the encapsulating packet and determines that the destination IP address of the IP packet is server 112.

In another example, VPN hub 101 may perform DPI on packets transmitted and received to and from server 112 respectively at VPN hub 101. Although server 112 does not establish any VPN connection with VPN hub 101. VPN hub 101 can perform DPI on any packet destined to server 112 that passes through VPN hub 101, and also on any packet received from server 112. For example, when a data session is established between host 114*a* and server 112, server 112 may transmit an IP packet to host 113*b* through VPN hub 101. The source IP address of the IP packet is the IP address of VPN hub 101. VPN hub 101 performs DPI on the IP packet and updates the DPI database if necessary. VPN hub 101 may then encapsulate the IP packet in an encapsulating packet, and then transmit the encapsulating packet to VPN gateway 111*a* through a first VPN connection. VPN gateway then decapsulates the encapsulating packet to retrieve the IP packet, and transmits the IP packet to host 114*a*.

There is no limitation that DPI must be performed at VPN hub 101. DPI can also be performed by one or more of VPN gateways 111, such VPN gateways 111*a*-111*c*. In a VPN hub-and-spoke network architecture, all IP packets will pass through VPN hub 101 before reaching another VPN gateway 111 or hosts in the VPN networks. Therefore, VPN hub 101 is able to perform DPI in substantial number of IP packets passing through the VPN connections it establishes with other VPN gateways and hosts. In one variant, VPN hub 101 may also perform DPI on IP packets to/from a host, such as server 112, which has no VPN connection established with VPN hub 101.

When DPI is performed at VPN gateway 111, VPN gateway 111 is not limited to perform DPI on IP packets that are transmitted and/or received through one or more VPN connections. VPN gateway 111 performs DPI on IP packets that are transmitted to and/or received from a node, which has no VPN connection established with VPN gateway 111. For example, when host 114*b* downloads a file from server 112 through VPN gateway 111*b*, server 112 may not have a VPN connection with VPN gateway 111*b*. VPN gateway may perform DPI on the file download session.

In one variant, the performance of steps 304-307 may not slow down other operations of VPN hub 101, such as routing and switching, because steps 304-307 may be performed by different cores of processing unit 801 or different threads of the operation system of VPN hub 101. When there are not enough computing resources, the performance of steps 304-307 may then impact the performances of other operations of VPN hub 101.

FIG. 3B is a flowchart illustrating one of the embodiments of the present invention. At step 321, VPN hub 101 develops a query to retrieve information. The query may be created by the administrator of VPN hub 101, created by VPN 101 and selected by the administrator, selected from a set of pre-defined queries and received by VPN hub 101 through interconnected networks 102.

At step 322, the query is executed to retrieve information from the DPI database. For example, the query may be developed to retrieve information related to data sessions to/from server 112 in step 321 and then executed by processing unit 801 of VPN hub 101 to retrieve the information from DPI database at step 322.

At step 323, when after the information is retrieved from the DPI database, the information is then used to develop a user interface for the administrator of VPN hub 101 to visualize the information. For example, the information retrieved the DPI database may be in text format, including Extensible Markup Language (XML), JavaScript Object Notation (JSON), comma-separated values (CSV) and tab-separated values (TSV), and is difficult to provide insights about the information intuitively. Therefore, at step 323, the information is used to develop user interface, such as those shown in FIG. 4A, FIG. 4B, FIG. 4D, FIG. 4E, FIG. 4F, FIG. 5A, FIG. 6A, FIG. 6B, FIG. 7A and FIG. 7B. The user interface may be built using hypertext markup language (HTML), scalable vector graphics (SVG), Qt, JavaScript, or any other computer languages or scripts that are capable to produce a user interface. Those who are skilled in the art would appreciate different tools, software, software libraries may be used to develop the user interface based on the information. In a preferred embodiment, the user interface is built using HTML, Javascript, cascading style sheets (CSS) and D3.js JavaScript library. The user interface may be shown at a display coupled to VPN hub 101 or sent to an electronic device, such as a laptop, desktop computer and smartphone, which is capable of displaying the user interface. The electronic device can be in the same local area network of VPN hub 101, same virtual private network of VPN hub 101 or different network that connects with VPN hub 101 through interconnected networks 102. After VPN hub 101 has generated the HTML, Javascript and CSS program instructions, the program instructions are sent to the electronic device to display the user interface.

There is no limitation that performance of steps 301-307 and steps 321-323 must be performed at VPN hub 101. As VPN gateways 111 also terminates VPN connection, VPN gateways 111 may also perform steps 301-307 and steps 321-323 for data sessions that going through them respectively.

FIG. 4A is a user interface illustrating how information retrieved from the DPI database can be displayed to a user or administrator according to one of the embodiments of the present invention. The information may comprise correlations between IP addresses, protocols, host identity, VPN gateway identity, applications or websites.

Column 401 has a first category of items comprising IP addresses of nodes that may be connected to VPN hub 101 through VPN connections. Column 402 has a second category of items comprising protocols and applications used by data sessions established through the IP addresses in column 401 or websites, hosts, or IP addresses accessed by IP addresses in column 401. Lines 403 show the correlation between the first category of items and the second category of items. For example, lines 403 are used to display which protocols in column 402 are used for data sessions established by IP addresses in column 401 or which websites in column 402 are accessed by IP addresses in column 401. For illustration purposes, IP address 10.80.1.1 establishes one or more SSL sessions, HTTP sessions, SIP sessions, and ICMP sessions, as shown by lines 403. In another example, IP address 10.8.9.21 establishes one or more CAPWAP sessions and IPSec sessions, and also establishes one or more data sessions with one or more Google servers and one or more Yahoo servers, as shown by lines 403. Items shown in columns 401 and 402 and lines 403 are based on the information retrieved from the DPI database.

For illustration purpose, IP address 10.80.1.1 is assigned to the WAN interface of VPN gateway 111b through which it establishes a VPN connection with VPN hub 101. Since host 114b is connected to VPN gateway 111b, the IP address assigned to host 114b is 10.80.1.3. IP address 10.8.9.13 is assigned to VPN gateway 111a. Although VPN gateway 111a has two WAN interfaces establishing VPN connections with VPN hub 101, the VPN connections are combined to form an aggregated VPN connection. Therefore the IP address assigned to VPN gateway 111a by VPN hub 101 is the IP address through which the aggregated VPN connection is established. IP addresses 10.8.9.20, 10.8.9.21, and 10.8.9.22 are assigned to Host 113a, host 113b and VPN gateway 111c by VPN hub 101 respectively. IP address 8.1.2.3 is the IP address of server 112. Server 112 has a public IP address. VPN hub 101 does not establish a VPN connection with server 112. Lines 403 may indicate whether there is any data session established through VPN hub 101 with server 112, and the protocols used by the data sessions. In one variant, instead of showing the IP address, the name of a host or VPN gateway can be shown in column 401. For example, the text "10.80.1.1" may be replaced by "VPN gateway 111b".

Similarly, lines 403 show which protocols or websites are being used by IP addresses 10.80.1.1, 10.80.1.3, 10.8.9.13, 10.8.9.20, 10.8.9.21, and 10.8.9.22. The first category of items may comprise host names, user identities, or identity information of the nodes connected to VPN hub 101, and is not limited to their IP addresses. The second category of items may comprise websites, IP addresses, host names, or identity information of nodes that are accessed by one or more items in the first category of items. The first and second categories are not limited to be displayed in columns. For example, the first categories may be a row at the top and the second category may be a column to the right to form a table.

The correlation between a selected item in column 401 and the second category of items can be dynamically indicated to the user. For example, when the user interface is displayed on a computer screen, the user can select an item by moving the cursor on the item, or by clicking on the item. The correlation can be indicated dynamically to the user by altering the appearance of lines corresponding to the selected item. For illustration purpose, when a user selects IP address 10.80.1.1, the appearance of lines corresponding to IP address 10.80.1.1 is dynamically changed from a solid line to a dotted line as illustrated in lines 403. This makes it visually easier for the user to detect the correlation between the selected item and the second category of items. The user can therefore differentiate all other lines from the lines indicating that IP address 10.80.1.1 establishes one or more data sessions using SSL protocol. HTTP protocol. SIP protocol, and ICMP protocol. It should be noted that there are many ways of indicating the correlation, and the scope of the invention is not limited to using dotted lines. For example, the appearance of the lines corresponding to a selected item can be changed by changing their color, or by flashing the lines, etc.

FIG. 4B is a user interface illustrating how information can be displayed to a user or administrator according to one of the embodiments of the present invention. Lines 413 display the correlation between the first category of items and the second category of items. In FIG. 4B, an item is selected from column 402 comprising the second category of items. For illustration purposes, the user selects "Google" from column 402 so that the correlation between "Google" and the first category of items is indicated. When the user selects "Google", the appearance of lines corresponding to "Google" is dynamically changed from a solid line to a dotted line as illustrated in lines 403. The user can therefore differentiate all other lines from the lines indicating that a Google server is accessed by IP addresses 10.8.9.20 and 10.8.9.21. That is, IP addresses 10.8.9.20 and 10.8.9.21 establish one or more data sessions with one or more Google servers, which is indicated by lines 413. It should be noted that there are many ways of indicating the correlation, and the scope of the invention is not limited to using dotted lines. For example, the appearance of the lines corresponding to a selected item can be changed by changing their color, or by flashing the lines, etc.

FIG. 4C illustrates a user interface that can be used to filter the items displayed in the diagram of FIG. 4A according to one of the embodiments of the present invention. Filtering user interface 404 comprises input fields such as number of records field 405, first category of items field 406, second category of items field 407, and update field 408. Number of records field 4405 is used to indicate the number of most recent records of a DPI database that should be displayed in a diagram. First category of items field 406 is used to filter the first category of items to be displayed. Second category of items field 407 is used to filter the second category of items to be displayed. Update field 408 is used to confirm the filters and update the diagram according to the filter(s).

FIG. 4D illustrates a user interface generated after applying filter(s) shown in FIG. 4C according to one of the embodiments. FIG. 4D should be viewed in conjunction with FIG. 4A and FIG. 4C for better understanding of the embodiments. For illustration purposes, when the user enters "10" in the number of records field 405. VPN hub 101 determines to display on the diagram only the top ten records retrieved from the DPI database. When the user enters "10.80" in first category of items field 406, VPN hub 101 determines to display on the diagram only the IP addresses starting with "10.80". The user can then apply the filters by clicking update field 408. VPN hub 101 then updates the user interface from the diagram in FIG. 4A to the diagram in FIG. 4D. Since the user entered "10.80" in first category of items field 406, only the IP addresses starting with "10.80" in the first category of items are displayed in column 421. IP address starting with "10.80" may be part of a query to retrieve information from the DPI database. Therefore, after applying the filter, only IP addresses 10.80.1.1 and 10.80.1.3 are displayed from the first category of items. In other words, a filtered first category of items consists of IP addresses 10.80.1.1 and 10.80.1.3. Lines 423 show the correlation between the filtered first category of items and the second category of items. For illustration purpose, when the user selects IP address 10.80.1.1, the appearance of lines corresponding to IP address 10.80.1.1 can be changed dynamically from solid lines to dotted lines.

Filtering user interface 404 can also be used to filter the second category of items in column 402 to display a filtered second category of items in column 422.

The fields in filtering user interface 404 can be used exclusive of each other. For example, a user can only use the first category of items field 406 to filter the first category of items and not use number of records field 405 and second category of items field 407.

The scope of the invention is not limited to the user filtering the first category of items by entering an IP address in the first category of items field 406. The user may enter a character string, a value, a criterion, or anything that may correspond to one or more items in the first category of items. Similarly, the user may enter in second category of items field 407 an IP address, a website name, a hostname, a protocol, character string, a value, a criteria, or anything that may correspond to one or more items in the second category of items.

Fields 405, 406 and 407 may comprise drop down menus providing suggestions to the user corresponding to each field. For example, when the user clicks on first category of items field 406, a drop down menu comprising suggestions such as the items in the first category of items. The user may click on a suggestion and enter a string in first category of items field 406. The string is used as a filter to filter out items that do not have the string. The suggestions are provided by VPN gateway hub 101. The value entered by a user in fields 405, 406 and/or 407 may be used as part of a query to retrieve information from the DPI database.

In one variant, for illustration purposes, as shown in FIG. 4A, IP address 10.80.1.1 establishes one or more SSL sessions, HTTP sessions, SIP sessions, and ICMP sessions, as shown by lines 403. An SSL tunnel may be used to establish sessions using other protocols such as HTTP and can also be used to access websites such as Google or Facebook. Those skilled in the art would know that packets may have various levels of encapsulation where a packet belonging to one protocol may be encapsulated in a packet belonging to another protocol. Therefore, if a HTTP packet is encapsulated in an SSL packet, and the HTTP session is established through the SSL tunnel by IP address 10.80.1.1, the diagram in FIG. 4A indicates that IP address 10.80.1.1 establishes one or more data sessions using SSL protocol.

In one variant, statistical information related to the data session may be shown near lines 403. For example, amount of bandwidth used by a data session may be shown above a line between one of the items in column 401 and one of the items in column 402. Statistical information may also include network performance of a VPN connection, number of data sessions, duration of data sessions, and monetary cost of data sessions. Statistical information may be determined by averaging, finding the maximum values, finding the minimum values and etc.

In another variant, as illustrated in FIG. 4E, when one or more data sessions are established through another data session, the protocols or websites corresponding to the one or more data sessions are also displayed. For illustration purposes, IP address 10.80.1.1 establishes one or more SSL sessions, HTTP sessions, SIP sessions, and ICMP sessions, as shown by lines 423. The SSL session is established by establishing a SSL tunnel. The SSL tunnel may be used to encapsulate access to websites and/or other data sessions. For illustration purpose, when an HTTP session is established through an SSL tunnel, an HTTP packet is encapsulated in an SSL packet and then the SSL packet is transmitted through a VPN connection. When IP address 10.80.1.1 is the selected item, column 430 is dynamically displayed and comprises protocols of data sessions established by IP address 10.80.1.1 through the SSL tunnel. Therefore, as illustrated in column 430, one or more HTTP sessions are established by IP address 10.80.1.1 through the SSL tunnel, and IP address 10.80.1.1 also accesses one or more Google servers and Facebook servers through the SSL tunnel. There could be many reasons why IP packets in the SSL tunnel can be analyzed using DPI techniques. For example, VPN hub 101 has the information to decrypt the SSL tunnel. In one variant, the SSL shown in column 430 may be referred to a SSL session.

Alternatively, as illustrated in FIG. 4F, when the IP address 10.80.1.3 is the selected item, Column 440 is dynamically displayed and comprises protocols of data sessions established by IP address 10.80.1.3 through the SSL tunnel. Therefore, as illustrated in column 440, one or more HTTP sessions are established by IP address 10.80.1.3 through the SSL tunnel, and IP address 10.80.1.3 also accesses one or more Facebook servers through the SSL tunnel. IP addresses 10.80.1.1 and 10.80.1.3 are IP addresses of VPN gateway 111b and 114b respectively. Host 114b can use the SSL tunnel established between gateway 111b and VPN hub 101 for transmitting or receiving data. Referring to FIG. 4E and FIG. 4F, host 114b establishes one or more HTTP sessions through VPN gateway 111b and also accesses one or more Facebook servers through VPN gateway 111b. This may indicate that Column 430 includes an item 'Google' because another host may be accessing one or more Google servers through VPN gateway 111b or VPN gateway 111b itself accesses one or more Google servers.

According to various of the embodiments of the present invention, the items displayed on may be selected from a group consisting of an IP address of a node, application, protocol of an encapsulating packet or IP packet, a policy, a location of an IP address, performance range through a network interface, range of the size of data being downloaded or uploaded, and a user-identity.

In one example, a node may be a device that is connected to interconnected networks 102. The IP address of a node may be the IP address of VPN gateways 111a-111c, hosts 114a-114b, or hosts 113a-113b. When a node has more than one WAN interfaces, the IP address of the node may be the IP address of one of its WAN interfaces. Alternatively, the IP address of a mode may be the IP address of server 112, or any other public server that is not administered by VPN hub 101.

An application may be the application corresponding to a particular data session at a particular node. For example, if host 113a is transmitting and receiving IP packets for video-conferencing, the application is video-conferencing. Other examples of applications that may be indicated as an item include Skype, NetFlix, SQL, Web, etc.

The protocol of encapsulating packets or IP packets belonging to a data session established through one of the nodes may be displayed as an item. For example, the protocol can be SSL, HTTP, DNS, SIP, CAPWAP. IPSec, ICMP, etc.

The performance of transmitting and receiving encapsulating packets or IP packets at a network interface of a node can be determined. The performance range may be selected from a group consisting of throughput range, bandwidth range, packet drop rate range, round trip time range, latency range, or other performance ranges. When the performance is determined, the performance range corresponding to the interface may be displayed.

The location of an IP address that is accessed by a node can be displayed as an item. The location of the IP address may be determined by using an IP geolocation database. For example, if gateway 111a accesses server 112, the location of server 112 is displayed.

The number of data sessions established through a network interface or at a node can be displayed as an item. Information related to data sessions is retrieved from a DPI database.

The size of content having been downloaded or uploaded at a node can be determined. For illustration purpose, a first, second and third items correspond to ranges of 0 MB-300 MB, 300 MB-600 MB, and 600 MB-800 MB for size of data being downloaded. If host 113a is downloading a file and has downloaded 700 MB, the item corresponding to host 113a is correlated to the third item. This is because 700 MB falls within the range of 601 MB-800 MB which corresponds to the third item. Therefore, the correlation between host 113a and the third item is displayed on the user interface. In another example, the item displayed may be the progress of a file being downloaded or uploaded, or the total size of data that has been downloaded or uploaded already in an ongoing download or upload session.

The identity of a user of a node may be displayed as an item. For example, many users can log in and use host 113a. The user identity of a user currently logged in to host 113a, or user identities of users logged in to host 113 in a specific time period can be displayed as an item.

Those skilled in the arts would appreciate that the scope of the invention is not limited to displaying the items described above, such that other kinds of items may also be displayed at the user interface.

FIG. 5 is a diagram illustrating how information is displayed on a user interface according to one of the embodiments of the present invention. The information, retrieved from a DPI database, may include correlations between nodes connected to VPN hub 101 and protocols, destinations, or websites. The difference between FIG. 5 and FIG. 4A is that FIG. 5 has three categories of items instead of two. FIG. 5 should be viewed in conjunction with FIG. 1 for better understanding of the embodiments.

Column 521 has a first category of items. Items 501, 502, 503, 504, 505, 506 and 507 represent VPN gateway 111a, host 114a, VPN gateway 111b, host 114b, VPN gateway 111c, host 113a, and host 113b respectively. The user interface allows a user or administrator to view what kind of traffic is passing through nodes connected to VPN hub 101 and what destinations are being accessed by nodes connected to VPN hub 101.

VPN gateways 111a-111c and hosts 113a-113b establish VPN connections with VPN hub 101.

Column 522 has a second category of items comprising protocols used by data sessions established by the first category of items. Column 523 has a third category of items comprising websites or nodes accessed by the first category of items.

Lines 530 illustrate the correlations between the first category of items and the second category of items. In other words, lines 530 illustrate which protocols are being used by data sessions established by each item in the first category of items.

Lines 531 illustrate the correlations between the first category of items and the third category of items. In other words, lines 531 illustrate which websites or destinations are being accessed by each item in the first category of items.

For illustration purposes, lines 530 correlate item 501 to several items in column 522 including SSL. HTTP, DNS, SIP, and IPSec. This indicates that VPN gateway 111a establishes one or more data sessions using SSL protocol, HTTP, SIP, and IPSec, and VPN gateway 111a also transmits or receives DNS traffic. Lines 531 correlate item 501 to several items in column 523 including item 511, and "Yahoo". This indicates that VPN gateway 111a accesses Server 112 and one or more Yahoo servers.

Since host 114a is connected to VPN hub 101 through VPN gateway 111a, item 502 is correlated to a subset of the items that item 501 is correlated to. Lines 531 correlate item 502 to SIP and IPSec, and Lines 531 correlate item 502 to item 511. This indicates that host 114a uses one or more data sessions using SIP and IPSec, and that host 114a accesses server 112.

In the illustration of FIG. 5, item 501 is a selected item. In other words, the user selects item 501 by moving the cursor on item 501 or by clicking item 501 so that the correlations shown by lines 530) and 531 between VPN gateway 111a and the second and third categories of items respectively, are dynamically indicated at the user interface.

For example, the correlation is indicated dynamically by changing the appearance of the lines corresponding to item 501. The appearance of a line can be changed by changing a solid line to a dotted line, or by changing the color of the line, or by flashing the line. This makes it visually easier for the user to detect the correlation between item 501 and the second and third category of items. The user can therefore differentiate all other lines from the lines indicating that VPN gateway 111a establishes one or more data sessions using SSL protocol, HTTP, SIP, and IPSec, accesses Server 112 and one or more Yahoo servers, and also transmits or receives DNS traffic.

FIG. 6A and FIG. 6B are diagrams illustrating how correlations between nodes connected to VPN hub 101 and protocols, destinations, or websites are displayed on a user interface according to one of the embodiments of the present invention. The difference between FIG. 6A or FIG. 6B and FIG. 5A is that, in FIG. 6A and FIG. 6B, an item corresponding to a host which connects to VPN hub 101 through a VPN gateway is displayed inside the item corresponding to the VPN gateway.

For illustration purpose, item 602 is displayed inside item 601 as host 114a is connected to VPN hub 101 through VPN gateway 111a. Therefore, any IP packets originating from host 114a reach VPN hub 101 through VPN gateway 111a. Similarly, item 604 is displayed inside item 603 because host 114b is connected to VPN hub 101 through VPN gateway 111a.

As illustrated in FIG. 6A, when item 601 is selected, the appearance of lines corresponding to item 601 is changed. The dotted lines in lines 630 and 631 show that VPN gateway 111a establishes one or more data sessions using SSL protocol, HTTP protocol. SIP protocol, and IPSec protocol, accesses Server 112 and one or more Yahoo servers, and also transmits or receives DNS traffic.

Alternatively, as illustrated in FIG. 6B, when item 602 is selected, the correlations between host 114a and the second and third group of items should be dynamically indicated. Therefore, the appearance of only the lines linking item 601 to SIP and IPSec of column 522 and Item 511 of column 523 are changed dynamically. This is because host 114a only establishes one or more data sessions using SIP and IPSec protocols, and accesses only Server 112 through VPN gateway 111a. It would be appreciated that when item 602 is the selected item, some, and not all lines corresponding to item 601 have changed in appearance. Because host 114a establishes the one or more data sessions using SIP and IPSec protocols, and accesses only Server 112 through VPN gateway 111a, the lines corresponding to host 114a are linked to item 601 instead of item 602.

According to one of the embodiments of the present invention, items may be grouped and displayed together. For example, as illustrated in FIG. 6A, items 602 and 601 are grouped together because VPN gateway 111a and host 114a are owned by the same owner. In another example, items 602 and 601 are grouped together to show that VPN gateway 111a and host 114a are in the same geographical location. In another example, items 603 and 605 are grouped together in the display to show that VPN gateway 111b and VPN gateway 111c are of the same product model. Alternatively, items 603 and 605 are grouped together in the display to show that VPN gateway 111b and VPN gateway 111c are controlled by the same administrators. Those who are skilled in the art would appreciate that there may be various group criterion in the user interface, and the scope of the invention is not limited to the grouping stated above.

In one of the embodiments of the present invention. DPI may be performed by a VPN gateway, such as VPN gateway 111a. DPI is performed by VPN gateway 111a on IP packets or encapsulating packets originating from or destined to hosts connected to VPN gateway 111a through one or more of its LAN interfaces. Therefore, a user interface displaying the results of the DPI only display items corresponding to VPN gateway 111a, and no items corresponding to other VPN gateways or hosts connected to VPN hub 101. DPI may be performed by processing unit 901 of VPN gateway 111a by executing corresponding program instructions stored in secondary storage 904 or main memory 902 of VPN gateway 111a.

For example, in FIG. 7A and FIG. 7B, column 721 has a first category of items comprising items 601 and 602. Items 601 and 602 represent VPN gateway 111a and host 114a respectively.

Column 722 has a second category of items comprising protocols used by data sessions established by the first category of items. Column 723 has a third category of items comprising websites or destinations accessed by the first category of items.

Lines 730 illustrate the correlations between the first category of items and the second category of items. In other words, lines 730 illustrate which protocols are being used by data sessions established by each item in the first category of items.

Lines 731 illustrate the correlations between the first category of items and the third category of items. In other words, lines 731 illustrate which websites or destinations are being accessed by each item in the first category of items.

In FIG. 7A, item 601 is the selected item, while in FIG. 7B, item 602 is the selected item. The correlations between item 601 and the first and second category of items, and between item 602 and the first and second category of items are the same as that explained above in FIGS. 6A and 6B.

FIG. 10 is an illustration of information displayed on a user interface according to one of the embodiments of the present invention. The information is based on query results retrieved from a DPI database. The DPI database is located in secondary storage 804. The query is to retrieve amount of bandwidth used for VPN gateways 111a, 111b and 111c. The query results are then sent to an electronic device, such as a laptop, that is capable of using the query results to produce the information down on a display of the electronic device. The query results are sent to the electronic device in JSON format through HTTPS protocol through interconnected networks 102. The electronic device may then generate chart 1001. Chart 1001 may be built using a combination of HTML, Javascript, CSS and D3js based on the query results.

Date input 1041 and time range input 1042 may be used together to specify the date and time for the monitoring network traffic of VPN gateways 111a, 111b and 111c. When an administrator wants to see the network traffic usage of a certain date and time, the administrator may change the values of date input 1041 and time range input 1042 respectively. The values may then be used to form a query to query the DPI database.

Stacked bars 1010, 1020 and 1030 show the amount of bandwidth used by VPN gateways 111a, 111b and 111c respectively.

Section 1011 shows that the average amount of HTTP protocol related bandwidth used for VPN gateway 111a on 26 Mar. 2014 between 11:00 am and 01:00 pm is about 10 Mbps. Section 1012 and section 1013 show that the average amount of SIP protocol and SSL protocol related bandwidth used for VPN gateway 111a at same period are 10 Mbps and 10 Mbps respectively.

Similarly, section 1021 and section 1022 show that the average amount of SSL protocol and HTTP protocol related bandwidth used for VPN gateway 111b at same period are 20 Mbps and 15 Mbps respectively. Section 1031 and section 1032 show that the average amount of HTTP protocol and SIP protocol related bandwidth used for VPN gateway 111c at same period are 10 Mbps and 10 Mbps respectively.

Stacked bars 1010, 1020 and 1030 may also show protocols related bandwidth usage. There is no limitation that only the correlation among bandwidth usage, time, date and VPN gateways can be displayed on the user interface. Other information, for example, statistical information, geographical location of the VPN gateways 111a-111c and number of warning messages can also be shown along with the stacked bars even if information of the geographical location of the VPN gateways 111a-111c and number of warning messages is not provided by the DPI database. Information and data from other sources may be shown in the user interface with information from the DPI database. In addition, the information displayed is not limited to two dimensional charts, such that three dimensional charts or multi-dimensional charts can also be used to represent the information and the information is substantially based on query results retrieved from the DPI database. In one variant, when the administrator interacts with the user interface, one or more new queries may be generated based on the administrator's mouse movements, finger position, and/or data entry. The one or more new queries and corresponding query results may be sent to and received from the DPI database of VPN hub 101 through, for example, Asynchronous JavaScript and XML (AJAX).

BRIEF DESCRIPTION OF DRAWINGS

FIG. 2A is a sequence diagram illustrating communication steps according to one of the embodiments of the present invention.

FIG. 2C is a sequence diagram illustrating communication steps according to one of the embodiments of the present invention.

Figure 1:
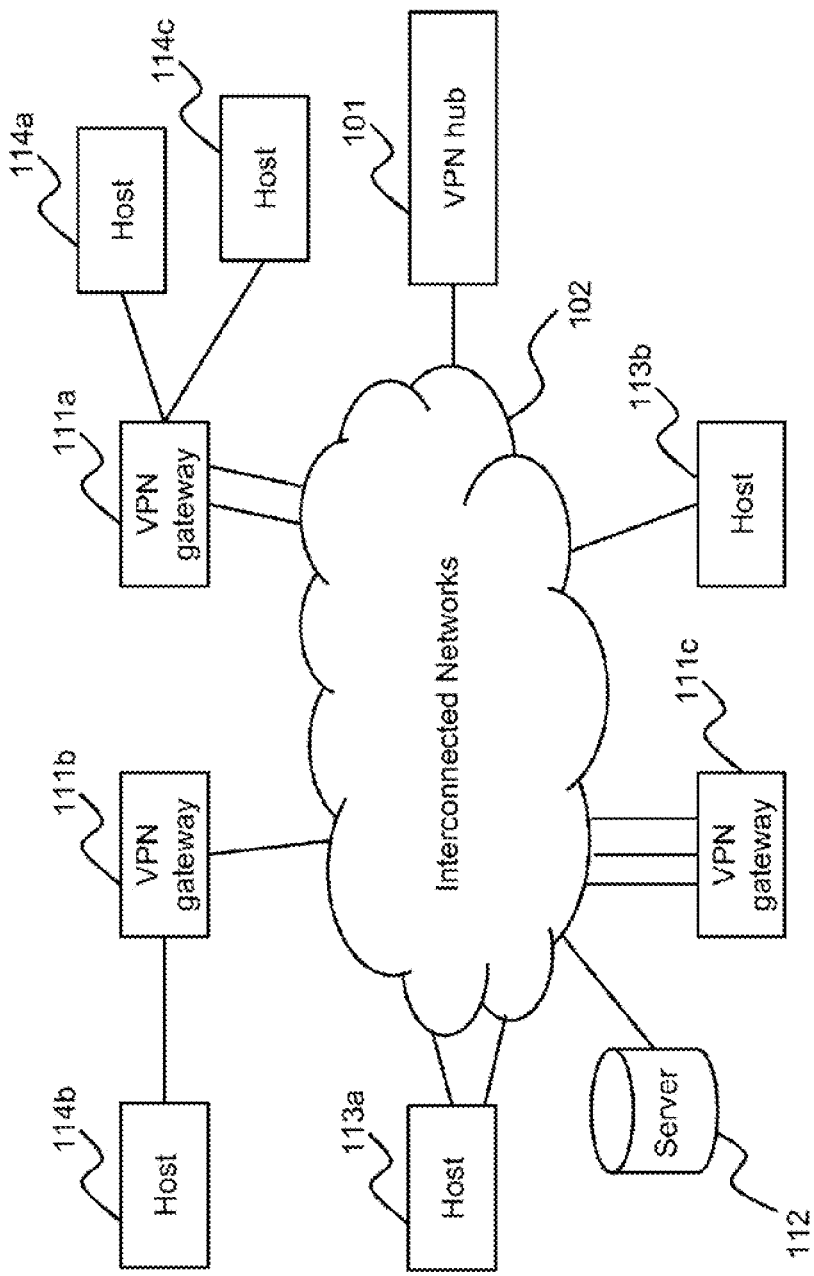
FIG. 1 illustrates an exemplary network environment according to various embodiments of the present invention.
Figure 2B:
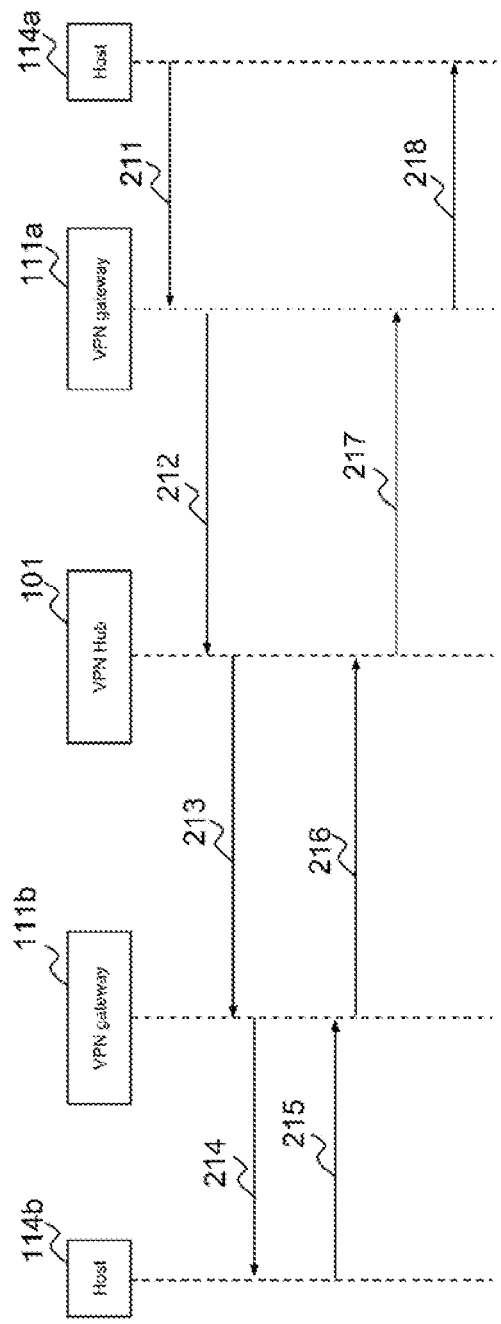
FIG. 2B is a sequence diagram illustrating communication steps according to one of the embodiments of the present invention.
Figure 3A:
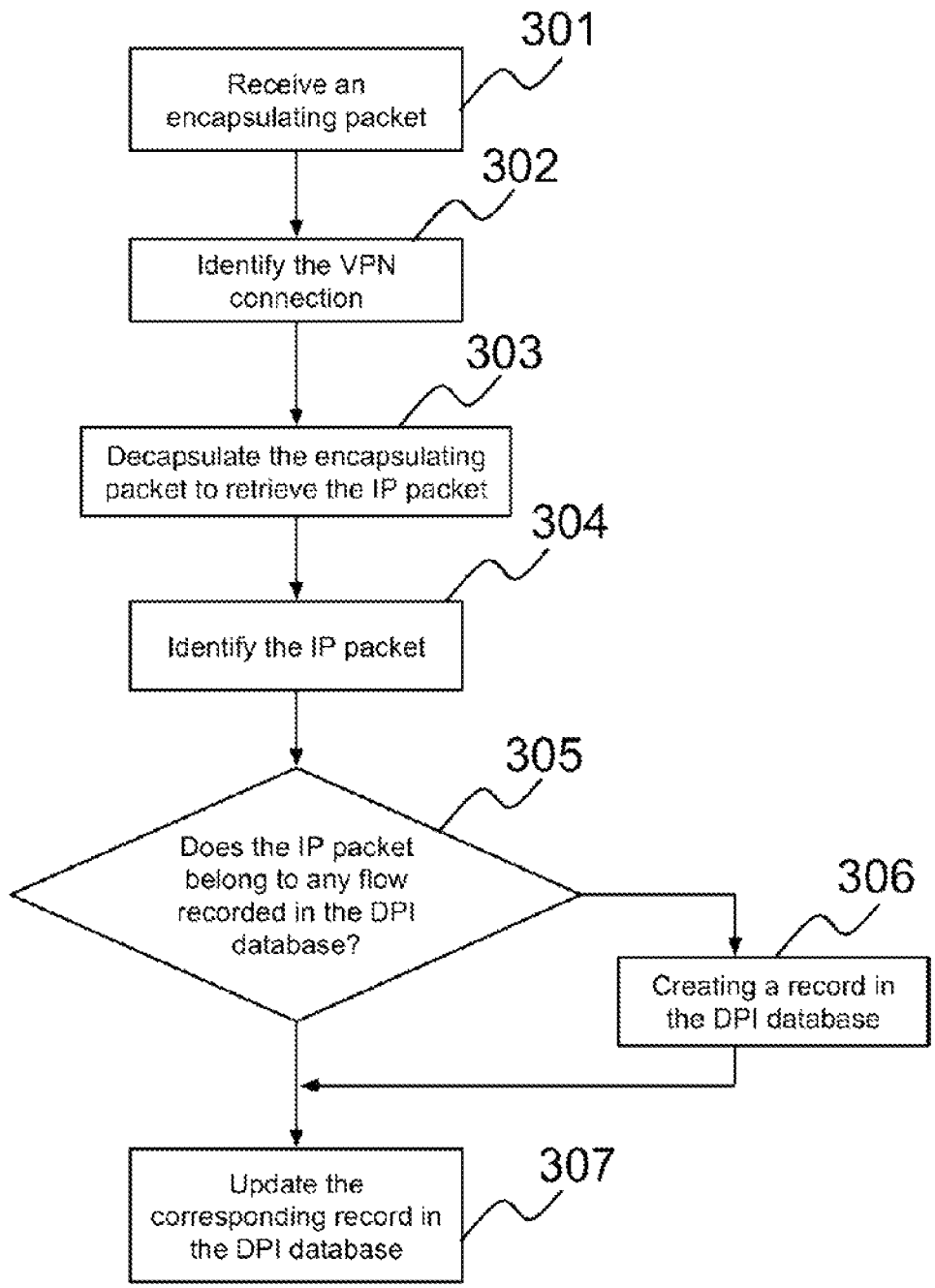
FIG. 3A illustrates a process according to one of embodiments of the present invention.
Figure 3B:
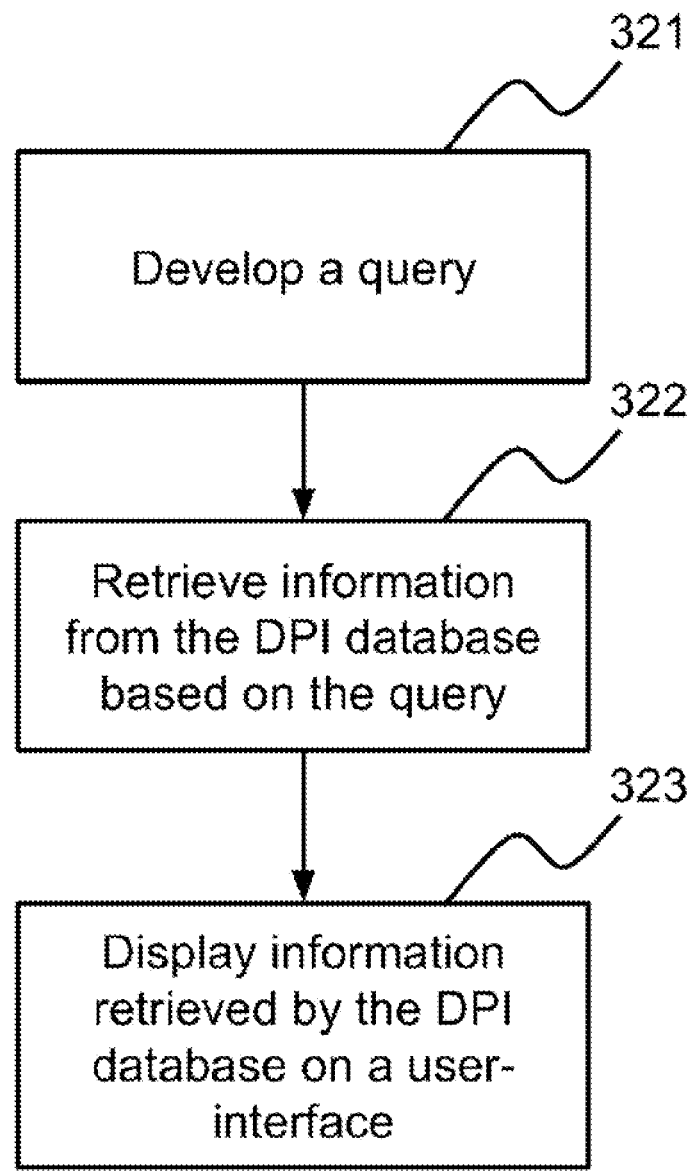
FIG. 3B is a flowchart illustrating one of the embodiments of the present invention.
Figure 4A:
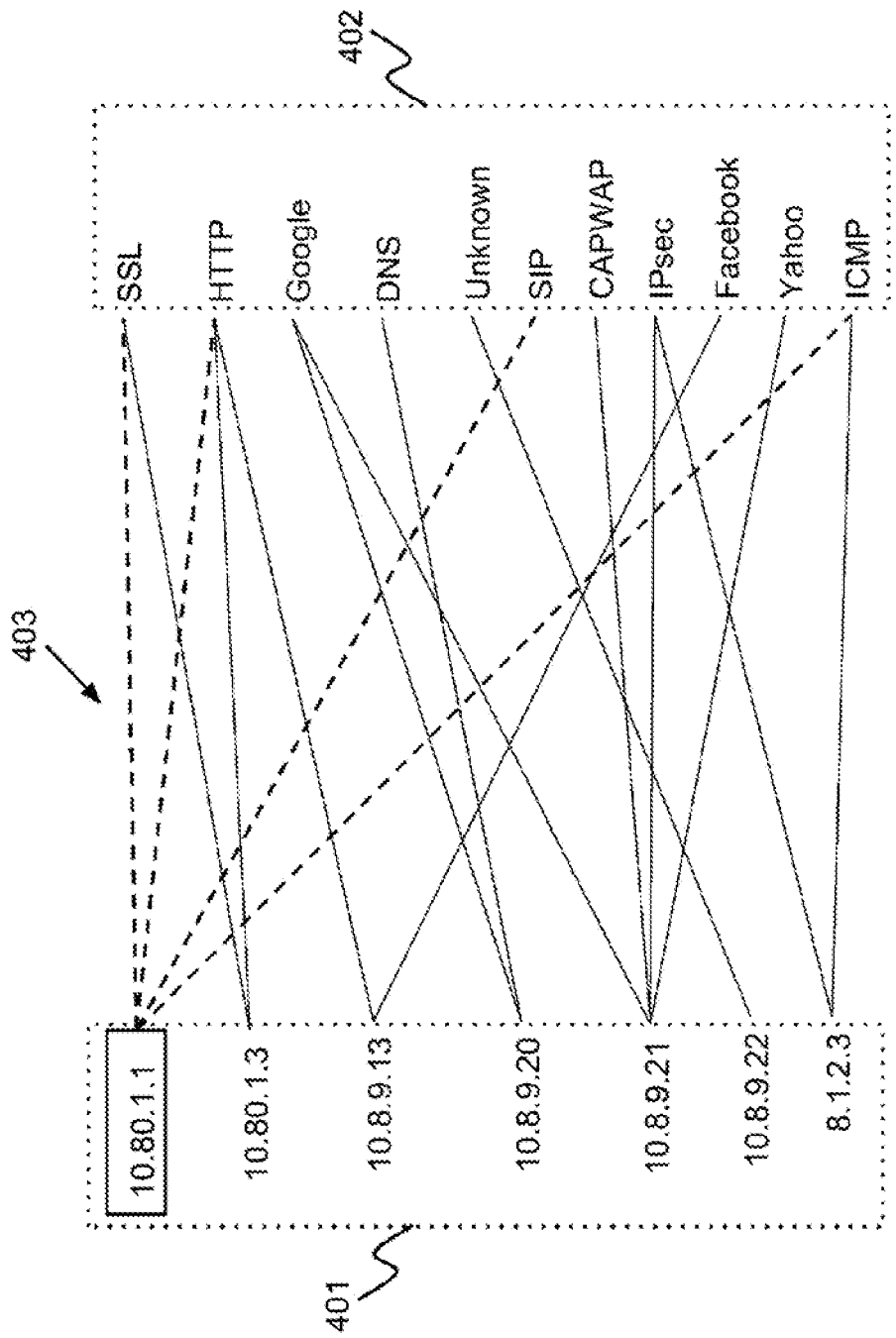
FIG. 4A is a user interface illustrating how information retrieved from the DPI database can be displayed to a user or administrator according to one of the embodiments of the present invention.
Figure 4B:
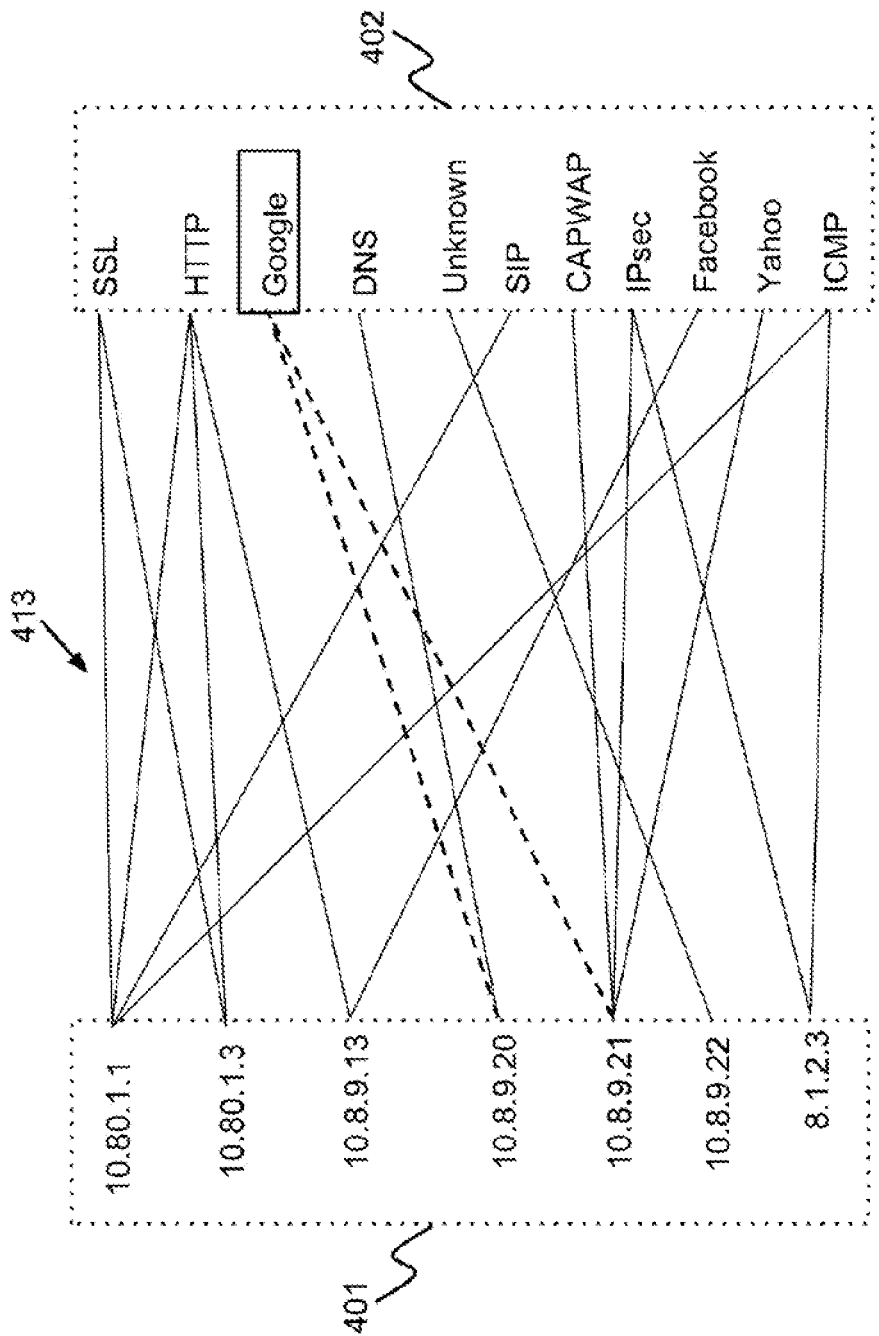
FIG. 4B is a user interface illustrating how information retrieved from the DPI database can be displayed to a user or administrator according to one of the embodiments of the present invention.
Figure 4C:
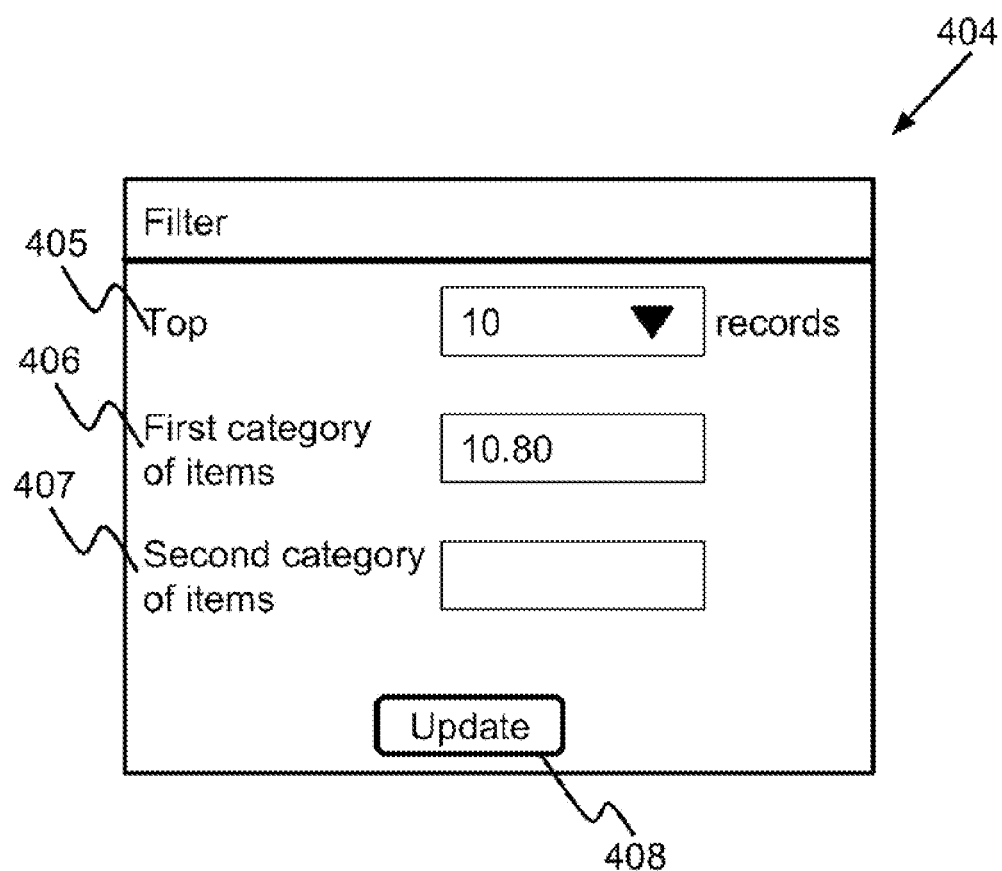
FIG. 4C illustrates a user interface that can be used to filter displayed items displayed according to one of the embodiments of the present invention.
Figure 4D:
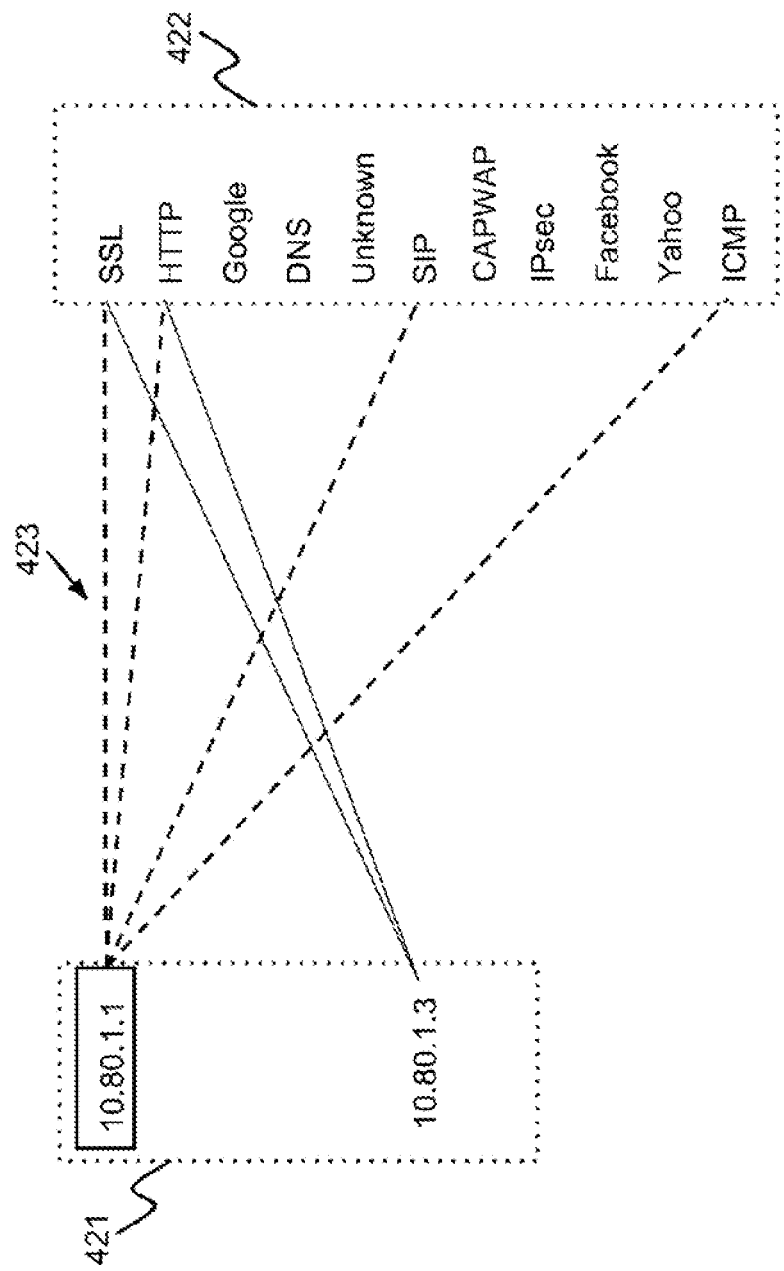
FIG. 4D illustrates a user interface generated after applying filter(s) according to one of the embodiments of the present invention.
Figure 4E:
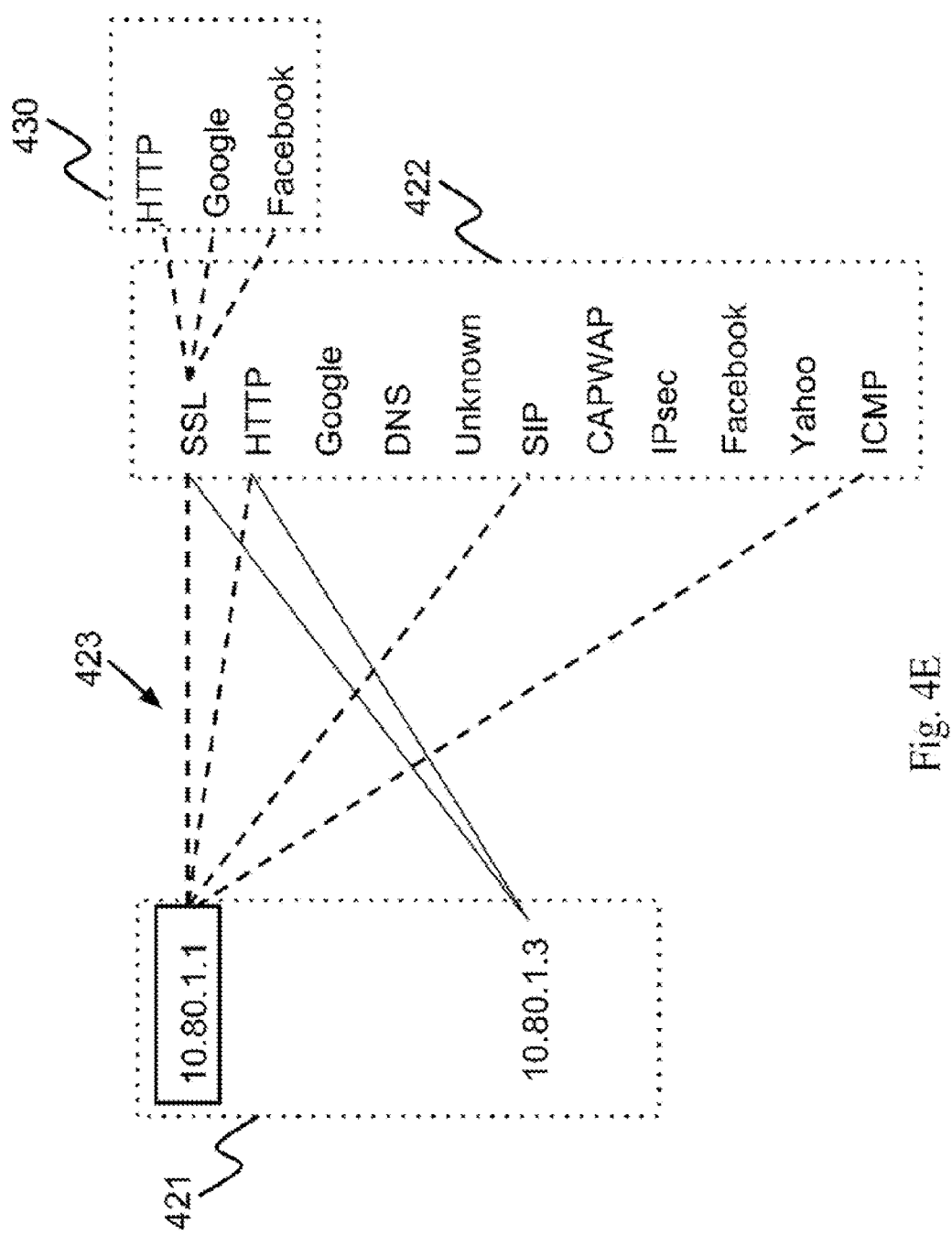
FIG. 4E is a user interface illustrating how information retrieved from the DPI database can be displayed to a user or administrator according to one of the embodiments of the present invention.
Figure 4F:
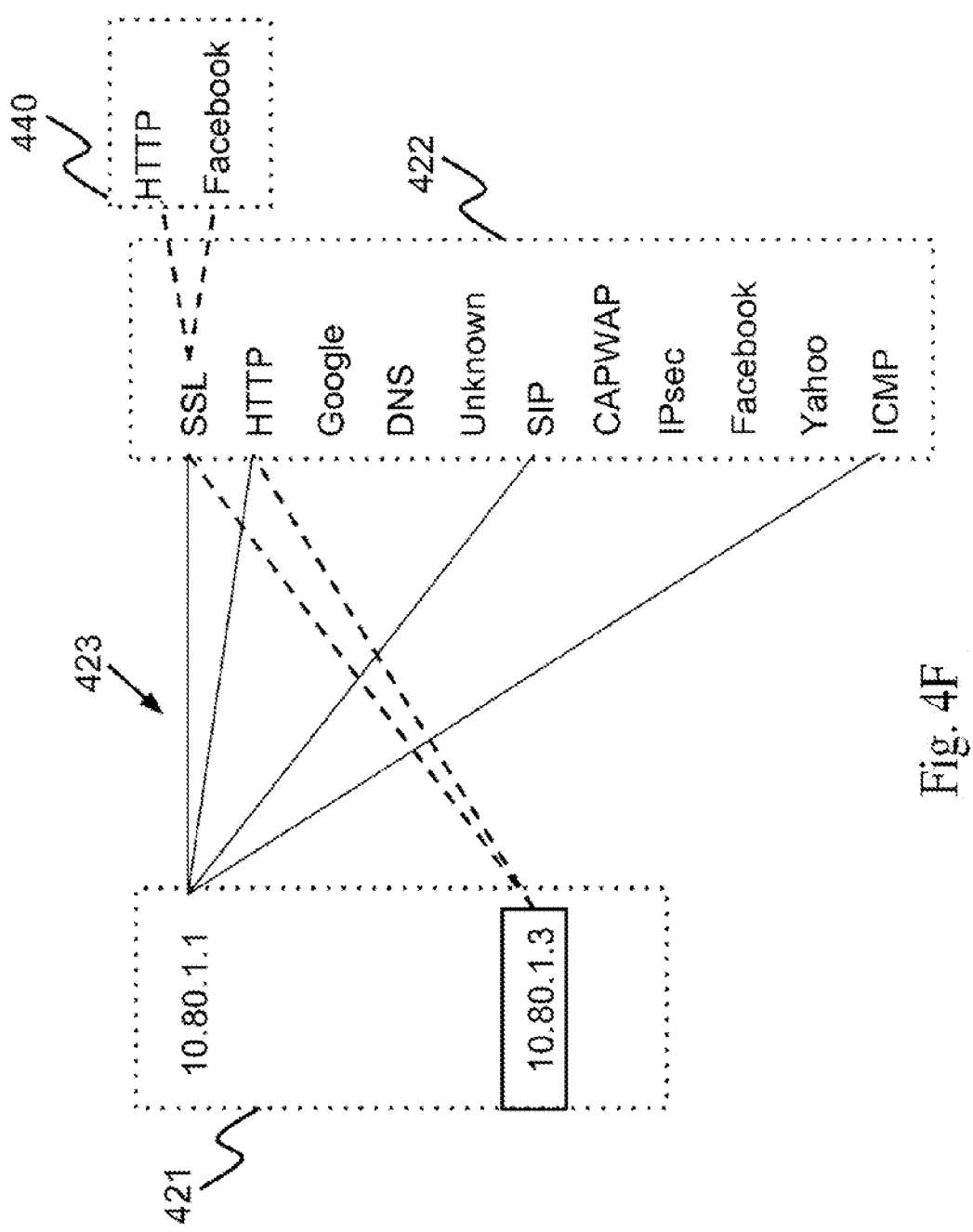
FIG. 4F is a user interface illustrating how information retrieved from the DPI database can be displayed to a user or administrator according to one of the embodiments of the present invention.
Figure 5:
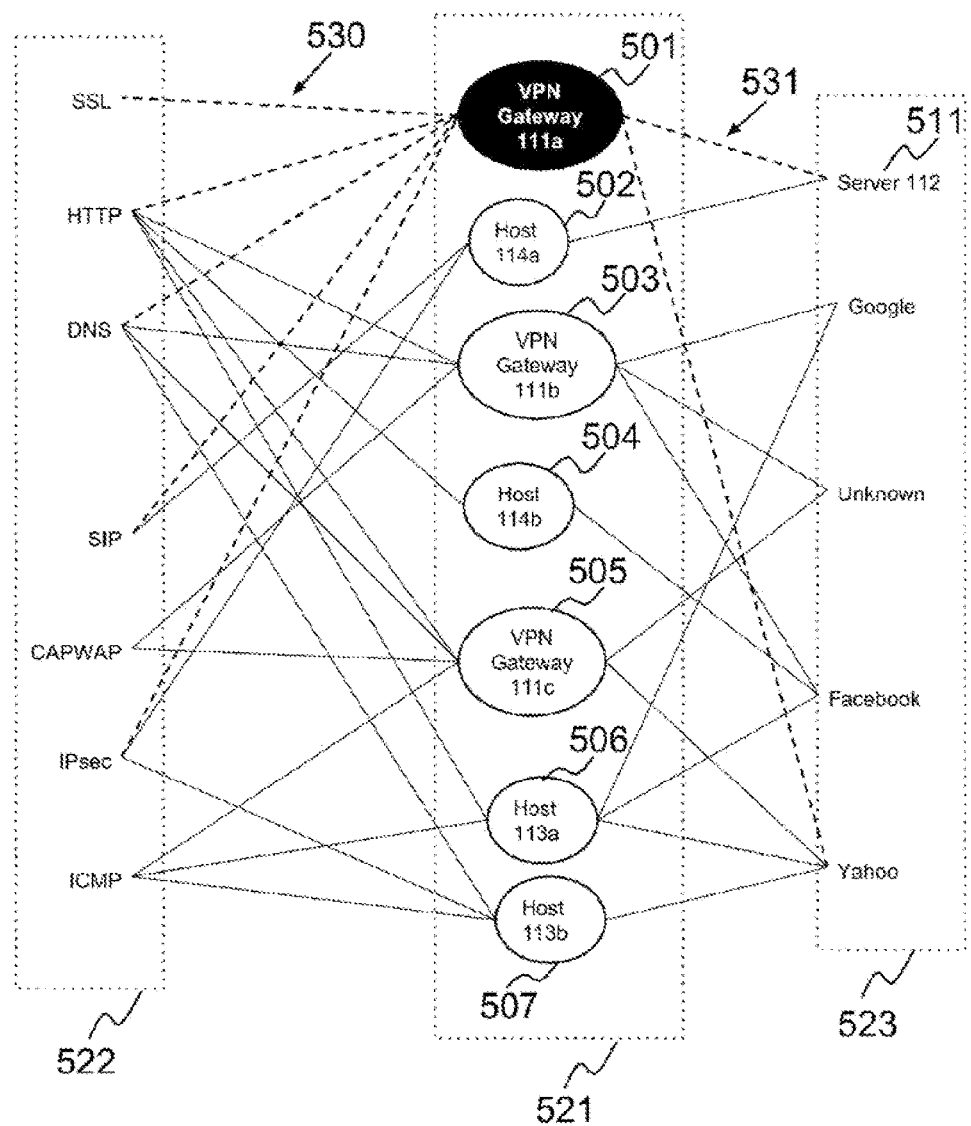
FIG. 5 is a user interface illustrating how information retrieved from the DPI database can be displayed to a user or administrator according to one of the embodiments of the present invention.
Figure 6A:
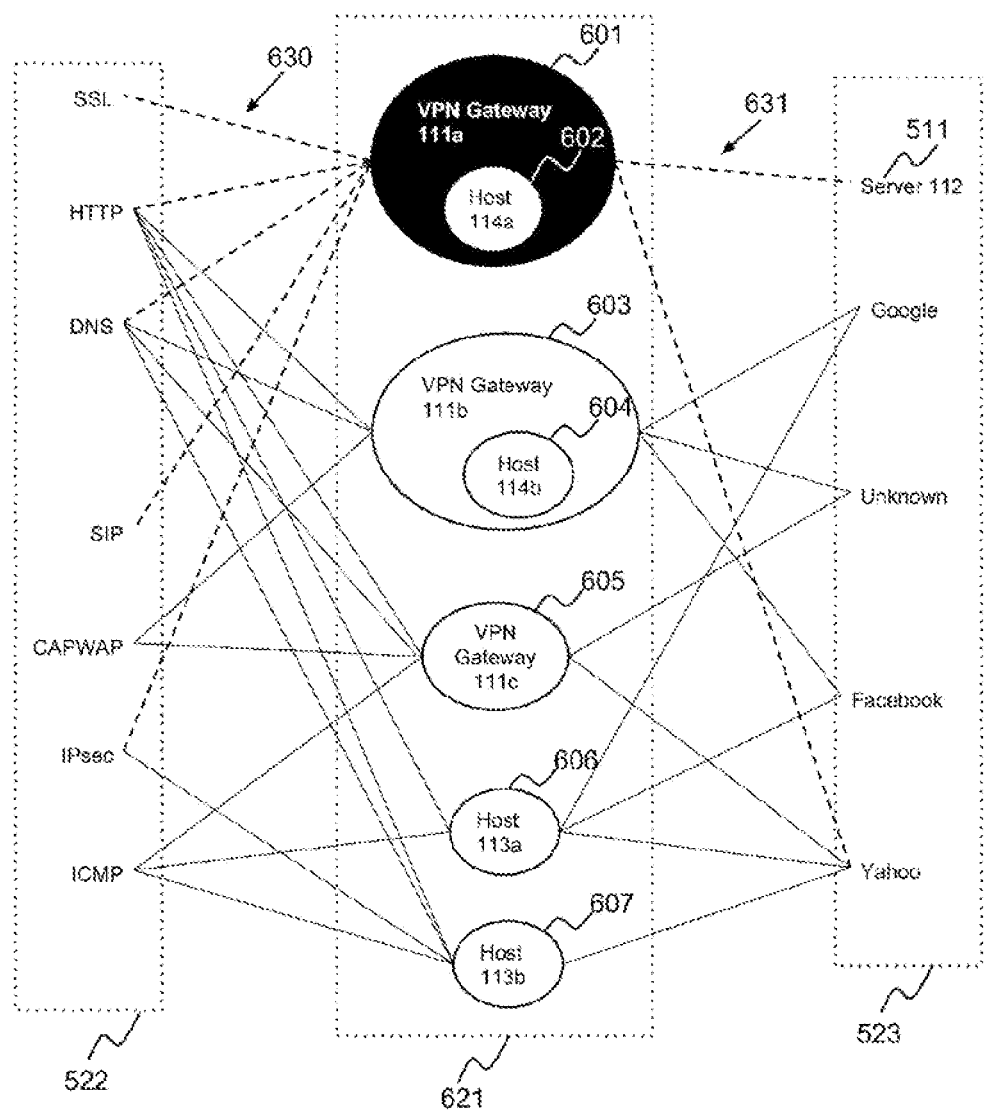
FIG. 6A is a user interface illustrating how information retrieved from the DPI database can be displayed to a user or administrator according to one of the embodiments of the present invention.
Figure 6B:
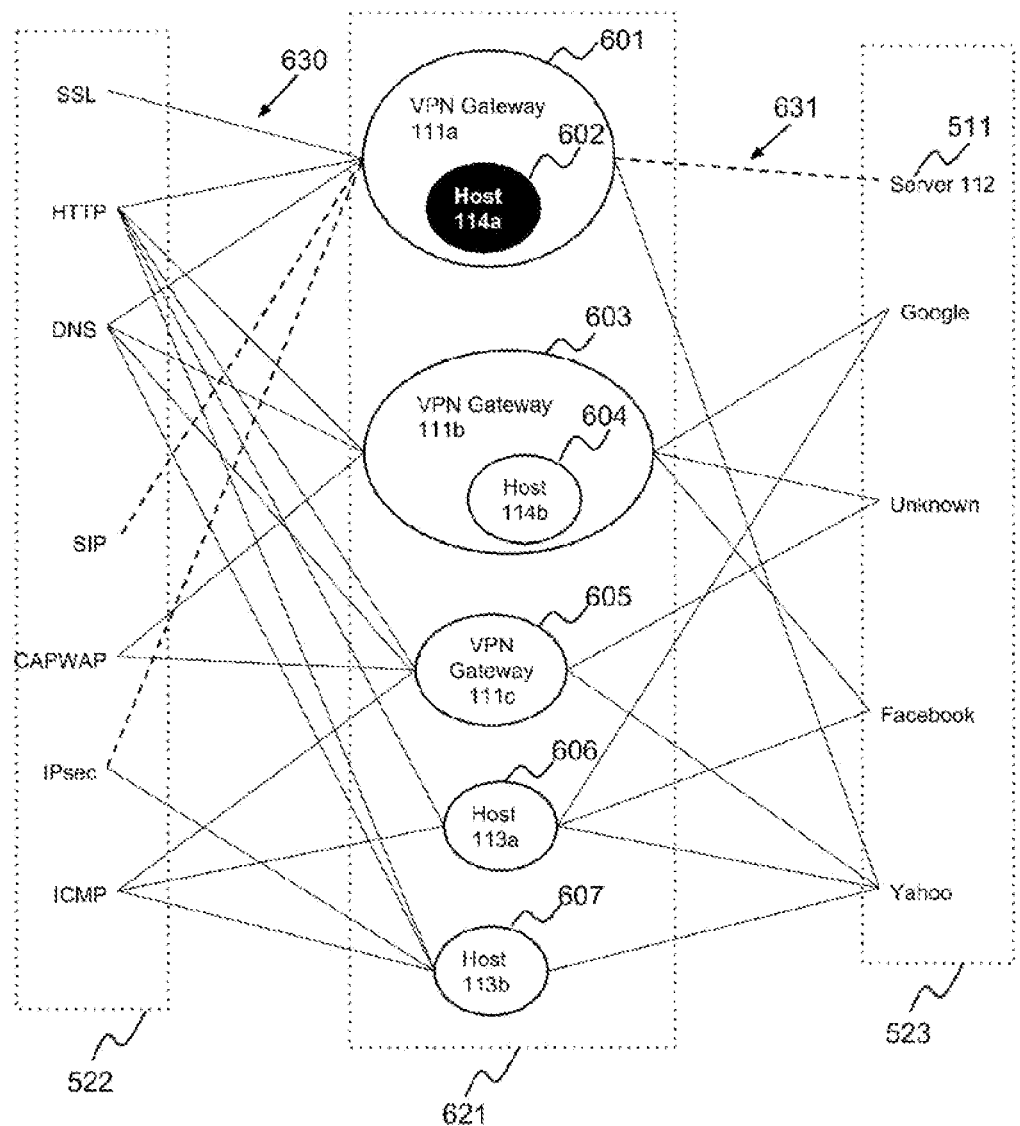
FIG. 6B is a user interface illustrating how information retrieved from the DPI database can be displayed to a user or administrator according to one of the embodiments of the present invention.
Figure 7A:
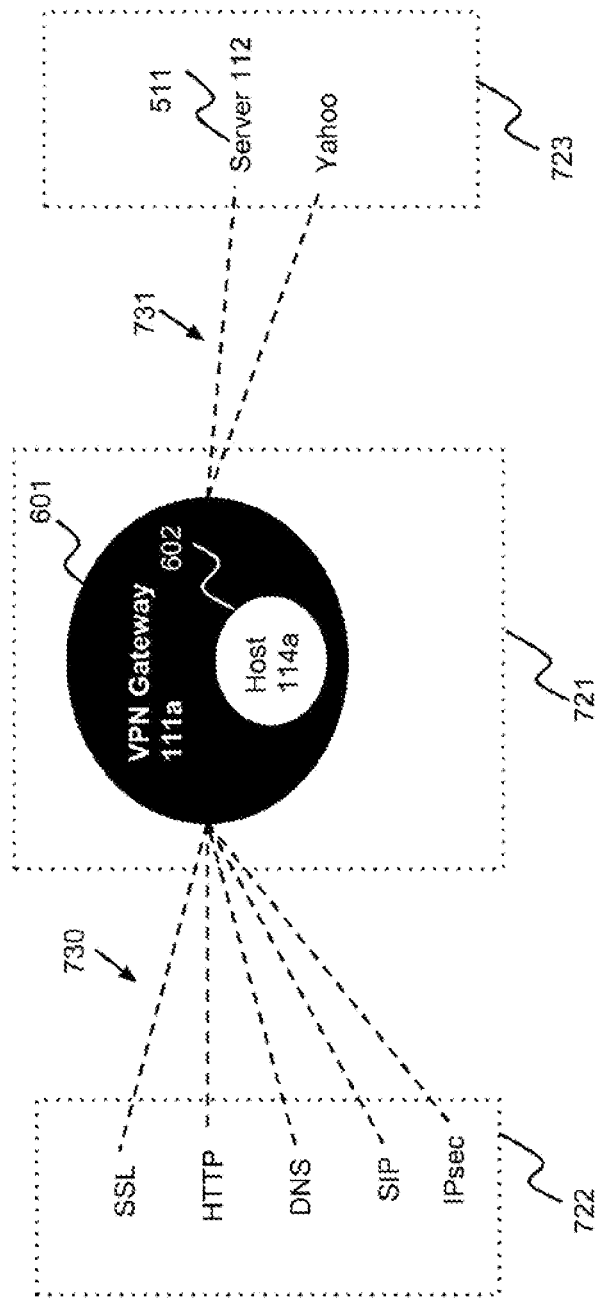
FIG. 7A is a user interface illustrating how information retrieved from the DPI database can be displayed to a user or administrator according to one of the embodiments of the present invention.
Figure 7B:
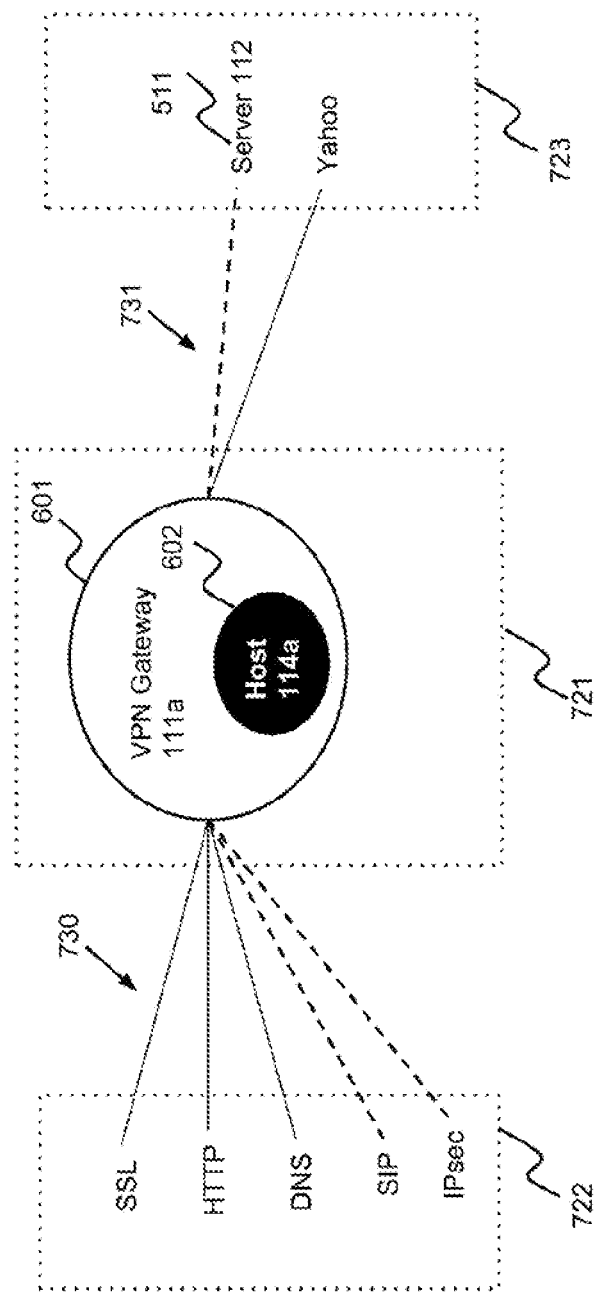
FIG. 7B is a user interface illustrating how information retrieved from the DPI database can be displayed to a user or administrator according to one of the embodiments of the present invention.
Figure 8:
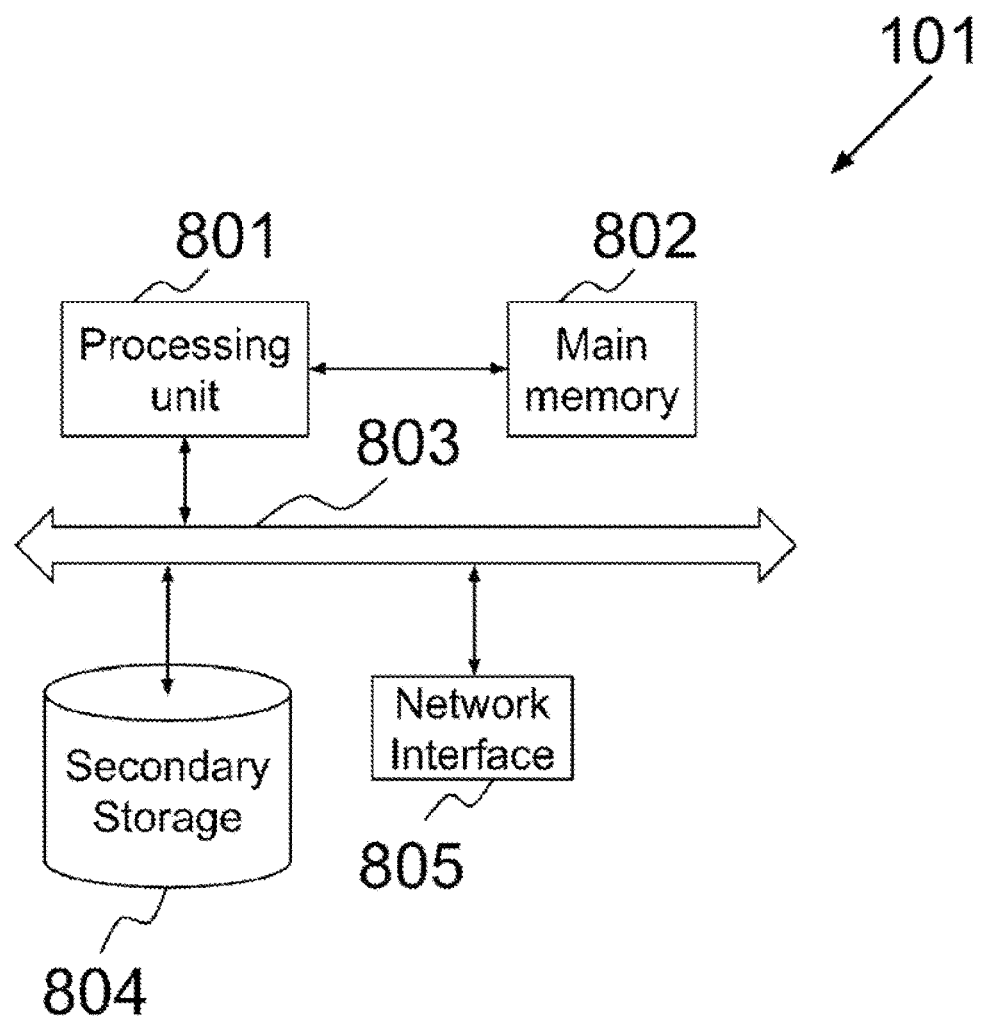
FIG. 8 is an illustrative block diagram of a VPN hub according to one of the embodiments of the present invention.
Figure 9:
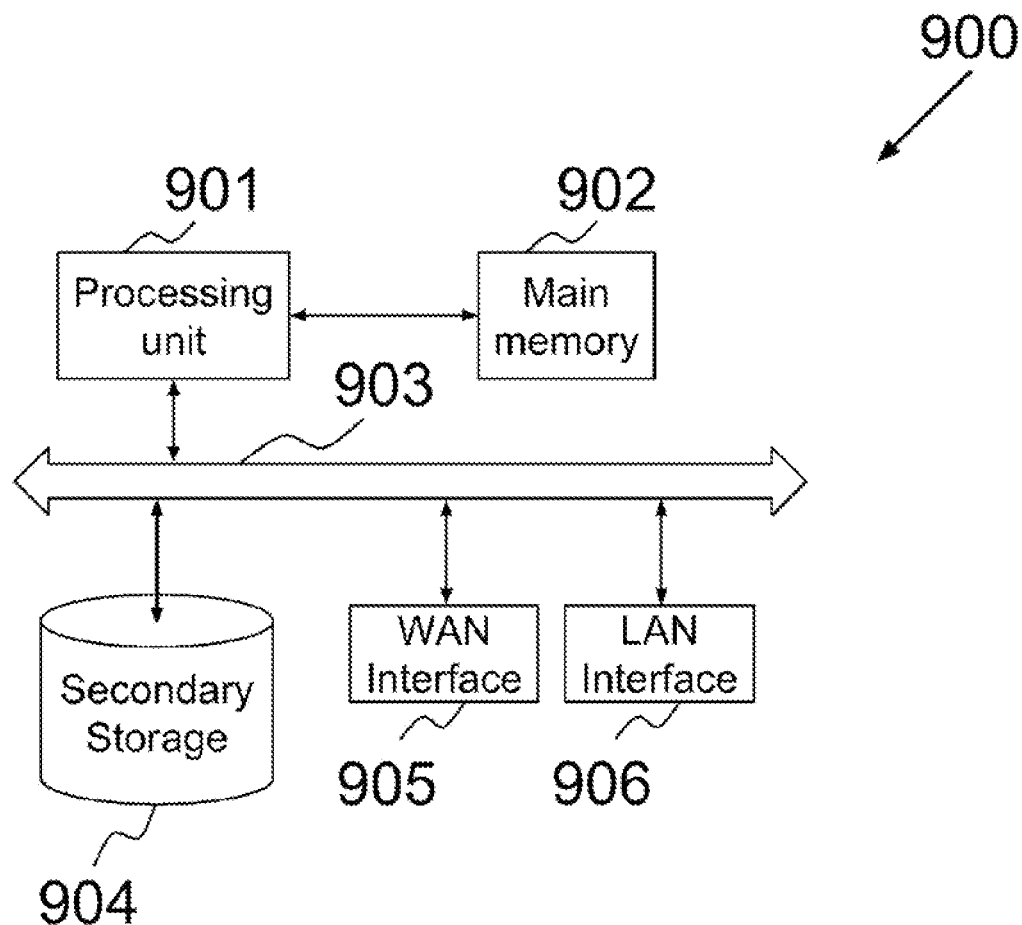
FIG. 9 is an illustrative block diagram of a VPN gateway according to one of the embodiments of the present invention.
Figure 10:
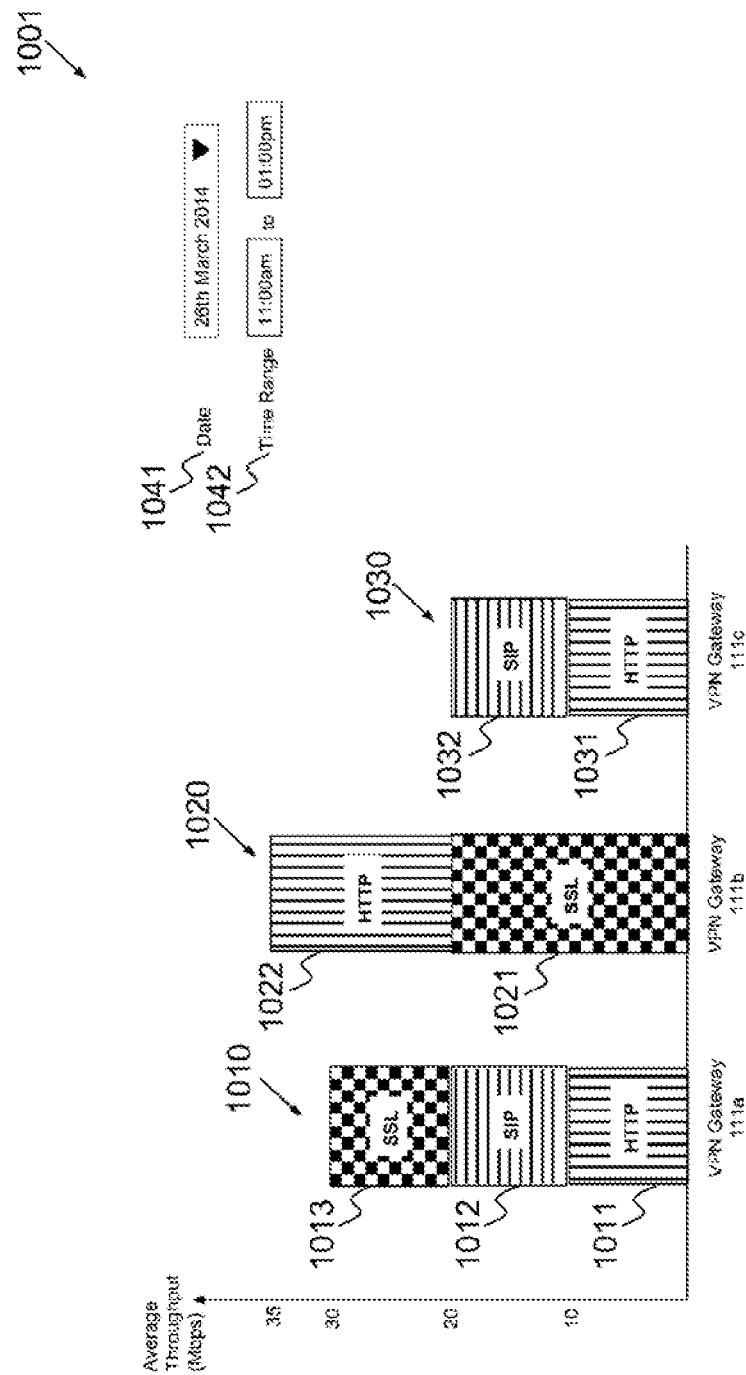
FIG. 10 is a user interface illustrating how information retrieved from the DPI database can be displayed to a user or administrator according to one of the embodiments of the present invention.

The invention claimed is:

1. A method for identifying Internet Protocol (IP) data sessions at a VPN gateway comprising:
 (a) receiving encapsulating packets, wherein the encapsulating packets encapsulate IP packets;
 (b) identifying a corresponding VPN connection;
 (c) decapsulating encapsulating packets to retrieve IP packets;
 (d) performing deep packet inspection (DPI) on the IP packets to identify one or more data sessions the IP packets belong to; and
 (e) updating a DPI database based, at least in part, on the one or more data sessions; wherein the DPI database comprises information corresponding to the one or more data sessions, wherein the information comprises source IP address, destination IP address, starting time, application, protocol, user identity, source port, destination port, security information, VPN connection information, computing resource usage, bandwidth usage and statistical information, wherein statistical information comprises network performance of a VPN connection, number of data sessions, duration of data sessions, and monetary cost of data sessions;
 (f) displaying information corresponding to the one or more data sessions at a user interface, wherein the information is retrieved from the DPI database; wherein the user interface comprises a plurality of items, wherein the items are selected from a group consisting of au IP address of a node, application, protocol of an encapsulating packet or IP packet, a policy, a location of an IP address, performance range through a network interface, range of size of data being downloaded or uploaded, and a user-identity; wherein the information displayed at the user interface comprises correlation between the plurality of items; wherein the plurality of items are categorized and displayed according to a plurality of categories; wherein a specific correlation is indicated to a user by changing a line color of a line representing the specific correlation or by flashing the line representing the specific correlation.

2. According to the method of claim 1, further comprising:

wherein the plurality of items are displayed in a bar chart; wherein each of the plurality of items are differentiated with different patterns or colors.

3. According to the method of claim 2, wherein when an item represents a VPN gateway, and the VPN gateway connects to a host, the item corresponding to the host is displayed as a subset of the item corresponding to the VPN gateway.

4. According to the method of claim 3, further comprising storing the IP packets before performing step (d); wherein when step (d) is performed when the data session has ended.

5. According to the method of claim 4, wherein the plurality of categories is selected from a group consisting of source IP address, destination IP address, source port, destination port, IP protocol, application, accumulated size of IP packet payloads received, accumulated size of IP packet payloads transmitted, domain name, begin timestamp and end timestamp.

6. According to the method of claim 2, wherein the user interface is shown on a display, wherein the display is not coupled to the VPN gateway.

7. According to the method of claim 2, wherein the information is retrieved from the DPI database after a query is performed.

8. According to the method of claim 2, wherein the information is categorized according to one category and statistical data.

9. According to the method of 1, wherein the VPN gateway is a VPN hub, wherein the VPN hub establishes one or more VPN connections with one or more other VPN gateways respectively.

10. According to the method of 9, wherein the one or more VPN connection can be an aggregated VPN connection.

11. According to the method of claim 1, wherein the step of updating includes adding a new record in the DPI database if one or more data sessions are identified the first time.

12. A VPN gateway for identifying Internet Protocol (IP) data sessions, comprising:

at least one network interface;
at least one processing unit;
at least one main memory;
at least one secondary storage storing program instructions executable by the at least one processing unit for:
(a) receiving encapsulating packets, wherein the encapsulating packets encapsulate IP packets;
(b) identifying a corresponding VPN connection;
(c) decapsulating encapsulating packets to retrieve IP packets;
(d) performing deep packet inspection (DPI) on the IP packets to identify one or more data sessions the IP packets belong to; and
(e) updating a DPI database based, at least in part, on the one or more data sessions; wherein the DPI database comprises information corresponding to the one or more data sessions, wherein the information comprises source IP address, destination IP address, starting time, application, protocol, user identity, source port, destination port, security information, VPN connection information, computing resource usage, bandwidth usage and statistical information, wherein statistical information comprises network performance of a VPN connection, number of data sessions, duration of data sessions, and monetary cost of data sessions;
(f) displaying information corresponding to the one or more data sessions at a user interface, wherein the information is retrieved from the DPI database; wherein the user interface comprises a plurality of items, wherein the items are selected from a group consisting of an IP address of a node, application, protocol of an encapsulating packet or IP packet, a policy, a location of an IP address, performance range through a network interface, range of size of data being downloaded or uploaded, and a user-identity; wherein the information displayed at the user interface comprises correlation between the plurality of items; wherein the plurality of items are categorized and displayed according to a plurality of categories; wherein a specific correlation is indicated to a user by changing a line color of a line representing the specific correlation or by flashing the line representing the specific correlation.

13. The VPN gateway of claim 12, wherein the at least one secondary storage further storing program instructions executable by the at least one processing unit for:

storing the IP packets before performing step (d); wherein when step (d) is performed when the data session has ended.

14. According to the method of claim 13, wherein the plurality of categories is selected from a group consisting of source IP address, destination IP address, source port, destination port, IP protocol, application, accumulated size of IP packet payloads received, accumulated size of IP packet payloads transmitted, domain name, begin timestamp and end timestamp.

15. According to the method of 12, wherein the VPN gateway is a VPN hub, wherein the VPN hub establishes one or more VPN connections with one or more other VPN gateways respectively.

16. According to the method of 15, wherein the one or more VPN connection can be an aggregated VPN connection.

17. The VPN gateway of claim 12, wherein the step of updating includes adding a new record in the DPI database if one or more data sessions are identified the first time.

18. The VPN gateway of claim 12, wherein the plurality of items are displayed in a bar chart; wherein each of the plurality of items are differentiated with different patterns or colors.

19. The VPN gateway of claim 12, wherein the user interface is shown on a display, wherein the display is not coupled to the VPN gateway.

20. The VPN gateway of claim 12,
wherein the information is retrieved from the DPI database after a query is performed.

21. The VPN gateway of claim 12,
wherein the information is categorized according to one category and statistical data.

22. The VPN gateway of claim 12,
wherein when an item represents a VPN gateway, and the VPN gateway connects to a host, the item corresponding to the host is displayed as a subset of the item corresponding to the VPN gateway.

* * * * *